United States Patent [19]
Danielson et al.

[11] Patent Number: 6,003,363
[45] Date of Patent: Dec. 21, 1999

[54] LEAK DETECTION APPARATUS AND METHOD

[75] Inventors: Robert B. Danielson, Mahtomedi; Stanlee W. Meisinger, Golden Valley, both of Minn.

[73] Assignee: Fastest, Inc., St. Paul, Minn.

[21] Appl. No.: 09/156,476

[22] Filed: Sep. 18, 1998

[51] Int. Cl.⁶ .................................................. G01M 3/06
[52] U.S. Cl. ............................................. 73/49.2; 73/49.3
[58] Field of Search ...................... 73/49.2, 49.3

[56] References Cited

U.S. PATENT DOCUMENTS

| | | |
|---|---|---|
| H1045 | 5/1992 | Wilson . |
| 3,813,922 | 6/1974 | Oswald et al. . |
| 4,068,522 | 1/1978 | Poe . |
| 4,077,427 | 3/1978 | Rosan, Jr. et al. . |
| 4,114,426 | 9/1978 | McLean . |
| 4,419,883 | 12/1983 | Gelston, II . |
| 4,453,399 | 6/1984 | Thompson . |
| 4,571,986 | 2/1986 | Fujii et al. ........................ 73/49.3 X |
| 4,675,834 | 6/1987 | Furuse ............................... 73/49.2 X |
| 4,686,638 | 8/1987 | Furuse ............................... 73/49.2 X |
| 4,993,256 | 2/1991 | Fukuda ................................ 73/49.2 |

FOREIGN PATENT DOCUMENTS

| | | | |
|---|---|---|---|
| 641295 | 1/1979 | U.S.S.R. ................................ | 73/49.2 |
| 1308847 | 5/1987 | U.S.S.R. ................................ | 73/49.2 |
| 2173909 | 10/1986 | United Kingdom .................... | 73/49.2 |

*Primary Examiner*—Daniel S. Larkin
*Attorney, Agent, or Firm*—Merchant & Gould P.C.

[57] ABSTRACT

The invention provides an improved bubble leak tester, and associated method for performing a leak test and operating the leak tester, to test for leaks in a test part. The apparatus and methods of the invention allow for simple, inexpensive, quick and accurate testing of the test part, provides a visual indication of a leak, and eliminates the part damage and clean-up associated with conventional water immersion tests. Further, the apparatus and methods in accordance with the invention control liquid backflow, so that contamination and damage to the device is reduced. In one embodiment in accordance with the invention, a leak tester is provided that is connectable to a reference volume and a test volume for determining the presence of a leak in the test volume. The leak tester comprises a reference port for connection to the reference volume, a test port for connection to the test volume, a bubble chamber connected between the reference port and the test port, and apparatus for selectively controlling flow between the reference port and the bubble chamber and between the test port and the bubble chamber.

39 Claims, 24 Drawing Sheets

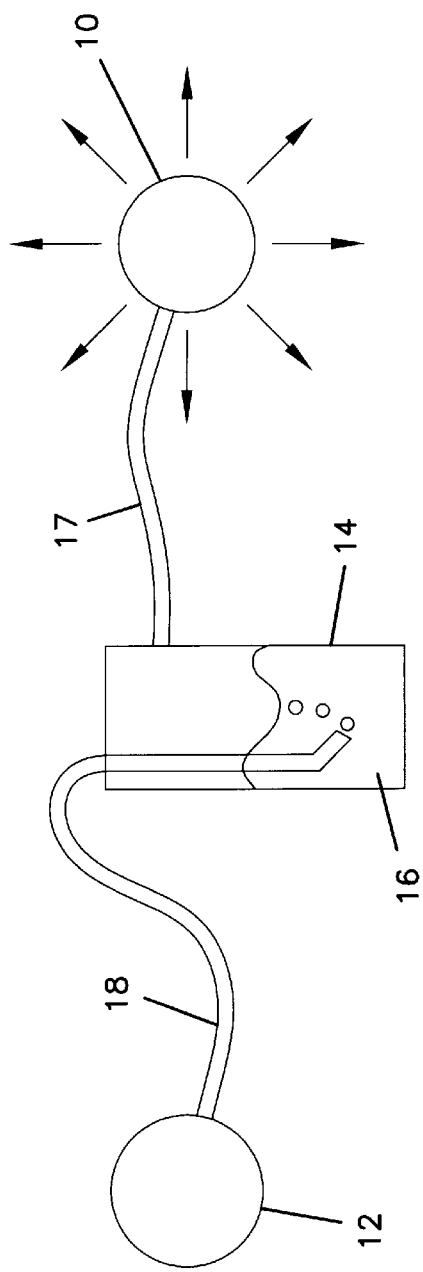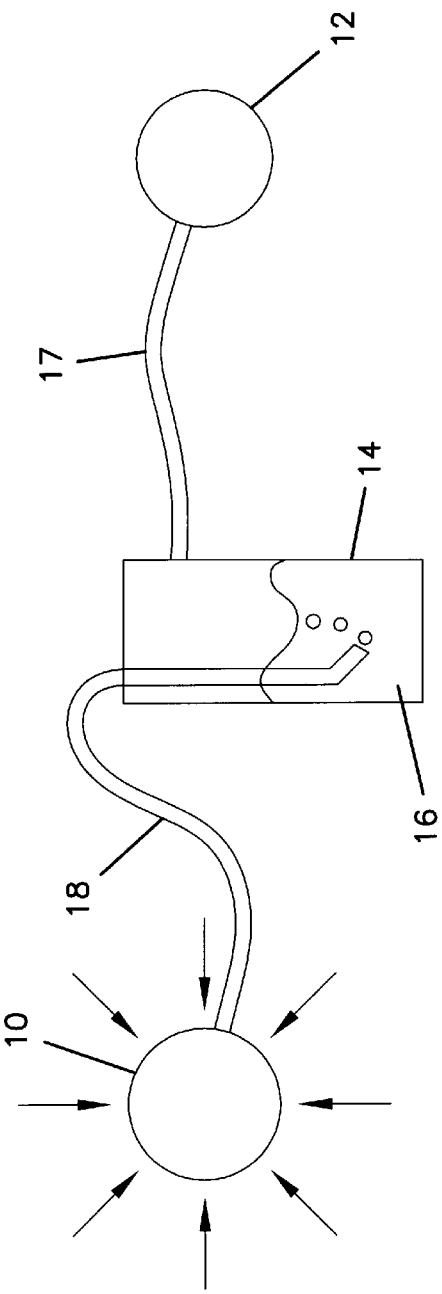
FIG. 1
FIG. 2

LEAK DETECTION APPARATUS AND METHOD

FIELD OF THE INVENTION

This invention relates to an apparatus and method for performing leak tests. More particularly, the invention relates to an apparatus and method for detecting leaks in a test specimen, without the need for immersing the test specimen in a liquid such as water.

BACKGROUND OF THE INVENTION

A leak test is typically performed on a part that is intended to hold a pressurized volume of gas therein, either under a positive pressure or a negative pressure, in order to test for a leak in the part. A known form of leak testing is a water immersion test where the part, while pressurized, is immersed into a body of water. The presence of bubbles in the water, or the ingress of water into the part, would indicate the presence of a leak in the part.

This type of leak test however requires that every part that is to be tested get wet as well as subsequently dried, thereby requiring a large amount of time and space, as well as increasing costs. Further, since the part is immersed, the part can corrode due to the water and harmful contaminants within the water can come into contact with the part.

An alternative to water immersion leak testing are bubble leak detection devices. In these devices, a bubble chamber is connected to the part to be tested and to a secondary volume. A source of pressure is used to pressurize the part and the secondary volume, and once pressurization is complete, the pressure source is disconnected. If there is a leak in the test part, bubbles will appear in the bubble chamber due to a resulting pressure difference between the test part and the secondary volume. Examples of such bubble leak detection devices include United States Statutory Invention Registration No. H1045 to Wilson, U.S. Pat. No. 4,419,883 to Gelston, II, and U.S. Pat. No. 4,453,399 to Thompson.

A problem with these conventional bubble leak detection devices is that a sudden large change in pressure between the test part and the secondary volume, which can be caused during disconnection of the secondary volume, can cause liquid in the bubble chamber to backflow into the flow passage and into the secondary volume and/or out of the device, due to the resulting large pressure difference between the test part and the other side of the bubble chamber. Backflow of the liquid can cause a delay in further testing as the liquid takes a period of time to flow back into the bubble chamber, so that the bubble chamber will not show a leak immediately during the next test.

Further examples of devices for detecting leaks include U.S. Pat. No. 3,813,922, U.S. Pat. No. 4,068,522, U.S. Pat. No. 4,077,427, and U.S. Pat. No. 4,114,426.

There is a continuing need however for an improved bubble leak detection apparatus and method that is simple to use and results in extremely accurate tests.

SUMMARY OF THE INVENTION

The invention provides an improved bubble leak tester, and associated methods for performing a leak test and operating the leak tester, to test for leaks in a test part. The apparatus and methods of the invention allow for simple, inexpensive, quick and accurate testing of the test part, provides a visual indication of a leak, and eliminates the part damage and clean-up associated with conventional water immersion tests. Further, the apparatus and methods in accordance with the invention controls liquid backflow, so that testing time is reduced and contamination and damage to the tester is reduced.

In one embodiment in accordance with the invention, a leak tester is provided that is connectable to a reference volume and a test volume for determining the presence of a leak in the test volume. The leak tester comprises a reference port for connection to the reference volume, a test port for connection to the test volume, a bubble chamber connected between the reference port and the test port, and means for selectively controlling flow between the reference port and the bubble chamber and between the test port and the bubble chamber.

By being able to selectively control flow between the reference port and the bubble chamber and between the test port and the bubble chamber, the potential for liquid from the bubble chamber to backflow into either the reference volume or the test volume due to a sudden large change in pressure in either volume is reduced. The means for selectively controlling flow can isolate both the reference port (and therefore the reference volume) and the test port (and therefore the test volume) from the bubble chamber to prevent such backflow from entering either of the volumes which could increase testing time as well as cause contamination of the volumes and the components of the tester.

Further, the means for selectively controlling flow allows pressure to be maintained across the bubble chamber, such that after pressurizing the test and reference volumes and placing the two volumes in communication with each other through the bubble chamber, a faster stabilization is achieved thereby further reducing testing time.

In another embodiment in accordance with the invention, a leak tester is provided comprising a housing which includes a reference port that is connectable to a reference volume and a test port that is connectable to a test volume, a bubble chamber connected between the reference port and the test port, and a valve arrangement disposed within the housing for controlling flow within the leak tester. The valve arrangement is capable of selectively controlling flow between the reference port and the bubble chamber and between the test port and the bubble chamber.

In accordance with another aspect of the invention, a method of performing a leak test is provided which comprises providing a bubble chamber, connecting a reference volume and a test volume to the bubble chamber with the reference volume and the test volume being in communication with each other and isolated from the bubble chamber, communicating the reference volume and the test volume with a source of pressure, isolating the reference volume and the test volume from the source of pressure once a predetermined pressure is achieved within the test volume, and communicating the reference volume and the test volume with each other through the bubble chamber to perform the leak test.

In yet another aspect of the invention, a method of operating a leak tester is provided. The leak tester has a reference port, a test port, an input port connected to the reference port and the test port, a bubble chamber connected between the reference port and the test port, and a valve arrangement capable of controlling flow between the reference port, the test port, the input port and the bubble chamber. The method comprises connecting a reference volume and a test volume to the reference port and the test port, respectively, with the reference volume and the test volume being isolated from the bubble chamber by the valve arrangement, and performing a testing procedure to determine the presence of a leak in the test volume. The testing procedure includes connecting a source of pressure to the input port and pressurizing the reference volume and the test volume, and placing the reference volume and the test volume in communication with each other through the bubble chamber.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

FIG. 1 is an illustration of the principles of operation of a bubble leak tester in accordance with the present invention, under positive pressure conditions.

FIG. 2 is an illustration of the principles of operation of a bubble leak tester in accordance with the present invention, under negative pressure conditions.

FIGS. 6B–6I are schematic illustrations of the valve arrangement in FIG. 6A at different stages in the operation of the bubble leak tester during a testing procedure.

DETAILED DESCRIPTION OF THE PREFERRED EMBODIMENT

Figure 3B:
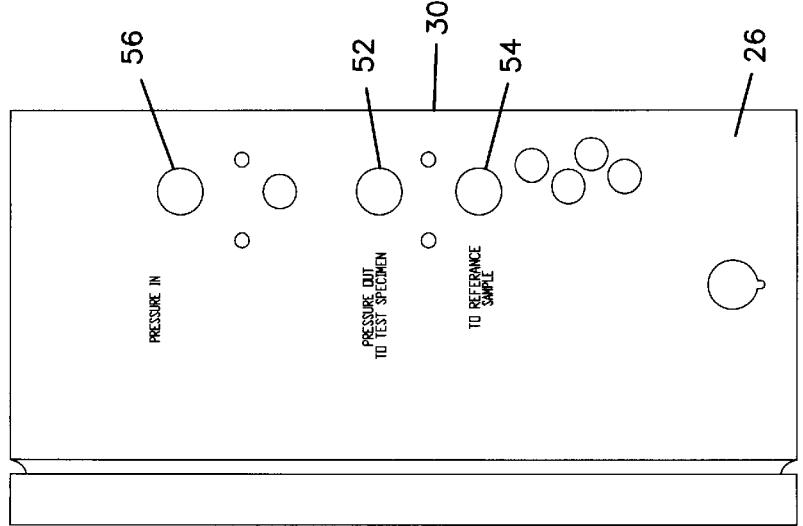
FIG. 3B is a side view of the bubble leak tester of FIG. 1.

With reference to FIGS. 1–2, the principles of operation of a bubble leak tester in accordance with the present invention are illustrated. Generally, the bubble leak tester is used to test for leaks in a test part having a test volume 10 by comparing the pressure in the test volume 10 with the pressure in a reference volume 12 across a bubble chamber 14 having a quantity of liquid 16, such as water, therein.

When the test and reference volumes 10, 12 are positively pressurized (i.e. pressure greater than atmospheric pressure), which is the case shown in FIG. 1, the pressure in the test volume 10 (i.e. test pressure) will be greater than atmospheric pressure. Any leak in the test part will permit test pressure to escape from the test volume 10, as shown by the arrows, thereby causing the test pressure to become lower than the pressure in the reference volume (i.e. reference pressure). Since the test volume 10 and the reference volume 12 are connected to each other through the bubble chamber 14 by flow passages 17 and 18, respectively, the test pressure and reference pressure will tend to equalize. Thus air will move toward the test volume to account for the loss in pressure. This movement of air is in the form of bubbles in the liquid 16 in the bubble chamber 14, thus signifying a leak in the test part.

In the case where the test volume and reference volume are negatively pressurized (i.e. pressure less than atmospheric pressure), such as shown in FIG. 2, the test volume 10 and reference volume 12 are switched such that test volume 10 is connected to flow passage 18 and reference volume 12 is connected to flow passage 17, with a flow of air occurring in the opposite direction. If the test part leaks, atmospheric pressure enters the test volume 10, as shown by the arrows, causing the test pressure to rise. This again causes a difference in pressure between the test pressure and reference pressure, such that the pressures tend to equalize thereby causing bubbles in the liquid 16 of the bubble chamber 14.

Prior to testing, the test and reference volumes should be allowed to stabilize for a period of time, to ensure that the starting pressures within the volumes are the same. However, during pressurization of the test and reference volumes 10, 12 thermal effects can alter the pressures within each volume, thereby adversely affecting the leak test. To minimize thermal effects, the test volume 10 and the reference volume 12 are preferably about the same size. Since the volumes are about equal, they will have substantially mirrored thermal effects, and due to their interconnection, the thermal effects are always counteracting, thereby minimizing the time needed to stabilize the volumes. However, the test and reference volumes could be of unequal size if desired, although a longer stabilizing time would be needed.

Figure 3A:
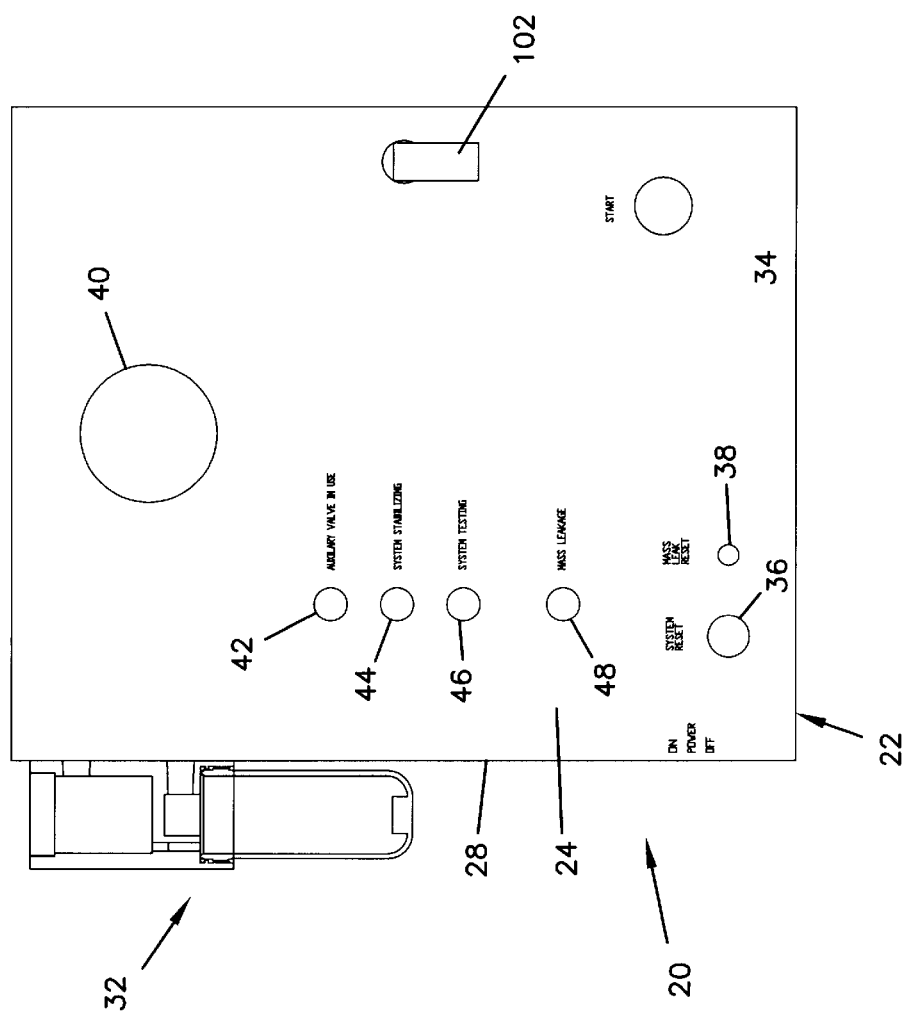
FIG. 3A is a front view of one embodiment of the bubble leak tester in accordance with the principles of the invention.

Turning now to FIGS. 3A and 3B, the bubble leak tester 20 of the invention is illustrated. The tester 20 includes a housing 22 having a front wall 24, a first side wall 26, a second side wall 28, and a rear wall 30, as well as top and bottom walls to thereby give the housing 22 a box-like shape. A bubble chamber 32 is mounted to one of the walls of the housing 22 on the exterior thereof, such as on the second side wall 28, to allow the bubble chamber 32 to be watched for the presence of bubbles during testing. If desired, the bubble chamber 32 could be disposed within the interior of the housing 22, with one or more of the housing walls being suitably modified to permit viewing of the bubble chamber 32 through the wall. For instance, the second side wall 28 could be wholly or partially made of a transparent material, such that the bubble chamber 32 disposed within the housing can be viewed.

Alternatively, an electronic sensor could be incorporated into the housing 22 to electronically sense and count the bubbles such that the presence of a leak could be detected automatically without the need for a person to watch the bubble chamber 32. The data gathered by the electronic sensor could be dumped to a central computer located externally of the tester 20 for analysis of the data.

The tester 20 is provided with a variety of switches that control operation of the tester 20, including a start switch 34 to start operation of the tester, a system reset switch 36 that is used with the start switch 34 to set the initial operating conditions of the tester, and a mass leak reset switch 38 which is actuated in the event of a mass leak in the tester and/or in the test volume and/or in the reference volume to reset the operating conditions of the tester.

A variety of gauges are also disposed on the front wall 24 of the tester 20 so as to provide an indication of operating conditions of the tester. The gauges include a pressure gauge 40 to provide an indication of pressure in the tester, an auxiliary indicator light 42 which indicates whether an auxiliary valve V8 of the tester is in use, a system stabilizing indicator light 44 which indicates when the tester 20 is in a stabilizing mode, a system testing indicator light 46 which illuminates when the tester is actually performing a test, and a mass leakage indicator light 48 which illuminates during a mass leak.

The tester 20 is further designed to allow connection with the test volume 10, the reference volume 12, and a source of pressure (referenced by reference numeral 50 in staring in FIG. 6A) that is used to pressurize the volumes 10, 12. In particular, the side wall 26 of the tester 20 is provided with a test port 52 to which the test part, and thus the test volume 10, is to be connected to perform a test. In addition, a reference port 54 is provided to which the reference volume 12 is connected, and an input port 56 permits connection of the pressure source to the tester.

Figure 4:
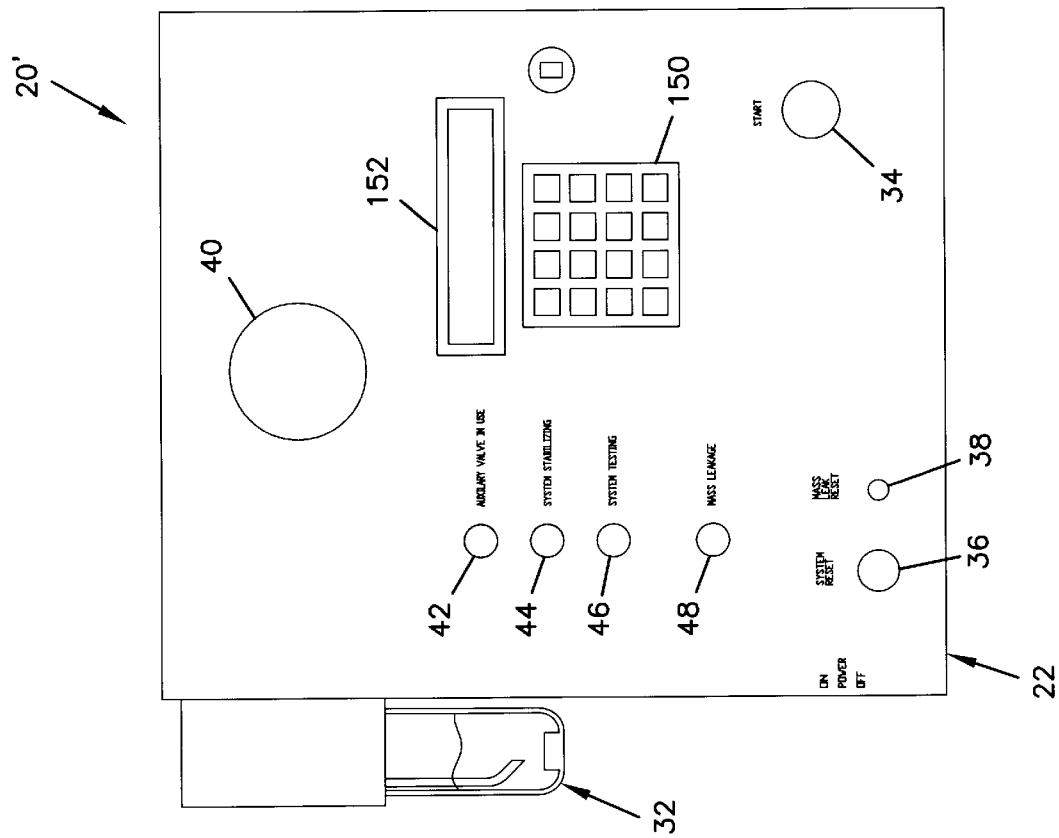
FIG. 4 is a front view of an alternate embodiment of the bubble leak tester using a keypad control and LCD display.

FIG. 4 illustrates a tester 20' that is similar to the tester 20 of FIGS. 3A, 3B. However, the tester 20' includes a keypad 150 and liquid crystal display (LCD display) 152 on the front wall 24. The keypad 150 allows a user to enter data into the main controller for the tester 20', thereby allowing the operation of the tester 20' to be changed by the user. The LCD display 152 is able to display the data that is being entered by the user on the keypad, in addition to displaying data or messages concerning the operation of the tester 20'.

As will be described in detail later in the description, the bubble chamber 32, the test port 52, the reference port 54 and the input port 56 are interconnected by a series of flow passages disposed within the interior of the housing 22. A valve arrangement is also provided for selectively controlling flow between the bubble chamber, the test port, the reference port and the input port. Thus, by connecting the test volume 10 to the test port 52, the reference volume 12 to the reference port 54, and the pressure source 50 to the input port 56, the valve arrangement can be suitably controlled to perform a bubble leak test to check for leaks in the test part.

Figure 5:
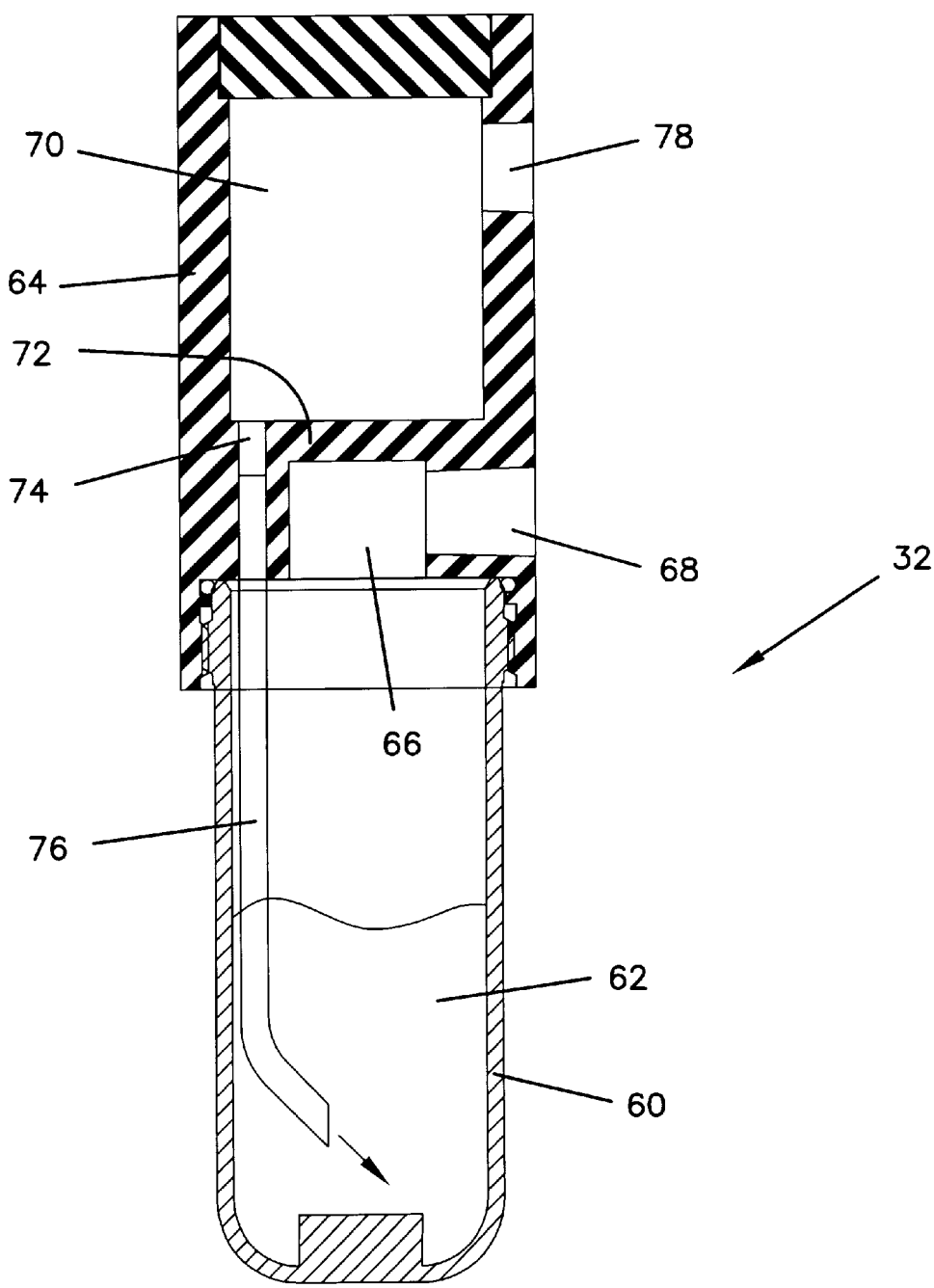
FIG. 5 illustrates a bubble chamber that can be used with the bubble leak tester of the invention.

However, prior to describing the valve arrangement in detail, reference is made to FIG. 5 which illustrates a preferred form of the bubble chamber 32. The bubble chamber 32 includes a housing 60 made of glass, clear plastic or other transparent material. The housing 60 is partially filled with a liquid 62, such as water, in which bubbles will form when there is a difference in pressure between the test and reference volumes. The housing 60 is generally tubular in shape, and is closed at one end and open at the opposite end. The end of the housing 60 that is open is threaded, and a cap 64 is removably screwed onto the open end of the housing by engaging with the housing threads, so as to close off the open end of the housing 60. The cap 64 is preferably made of aluminum, however other metals as well as plastic materials could be used if desired.

The bottom of the cap 64 includes a central bore 66 formed therein which communicates with the interior of the housing 60 above the level of the liquid 62, and a port 68 extends through the side of the cap 64 and into the bore 66 whereby the port 68 is in communication with the interior of the housing. The cap 64 further includes a reservoir 70 formed therein above the bore 66 and separated therefrom by a wall 72. A passageway 74 extends between the reservoir 70 and the bottom of the cap 64, and one end of a tube 76 is fit within the passageway and the opposite end of the tube 76 extends into the housing below the surface of the liquid 62. Therefore, the reservoir 70 is placed into communication with the liquid below the surface thereof. A further port 78 is formed in the side of the cap 64 to place the reservoir 70 in communication with the exterior of the cap.

The port 68 is connected, via the flow passages and valve arrangement mentioned previously, to either the test volume 10 or the reference volume 12, while the port 78 is connected, via the flow passages and valve arrangement, to either the reference volume 12 or the test volume 10, depending upon whether there is positive pressure or negative pressure. In the event of a change in pressure in the test volume, air will tend to flow into the reservoir 70 through the port 78, and then through the tube 76 in order to equalize pressure with the reference volume 12. Since the tube 76 extends beneath the surface of the liquid 62, air exiting therefrom is in the form of bubbles, thus providing a visual indication of the presence of a leak in the test part.

During a test, a person could mistakingly disconnect the reference or test volume, thereby causing a sudden large shift in pressure between the two volumes that could cause the fluid 62 in the housing 60 to be forced backwards up the tube 76. The reservoir 70 in the cap 64 collects such backflowing liquid and prevents it from exiting the port 78, to prevent contamination of the valve (to be later described) between the bubble chamber 32 and the reference or test volume. While a specific bubble chamber 32 has been described herein, it is to be realized that other bubble chambers could be used as well, such as a bubble chamber that does not include a reservoir.

Figure 12:
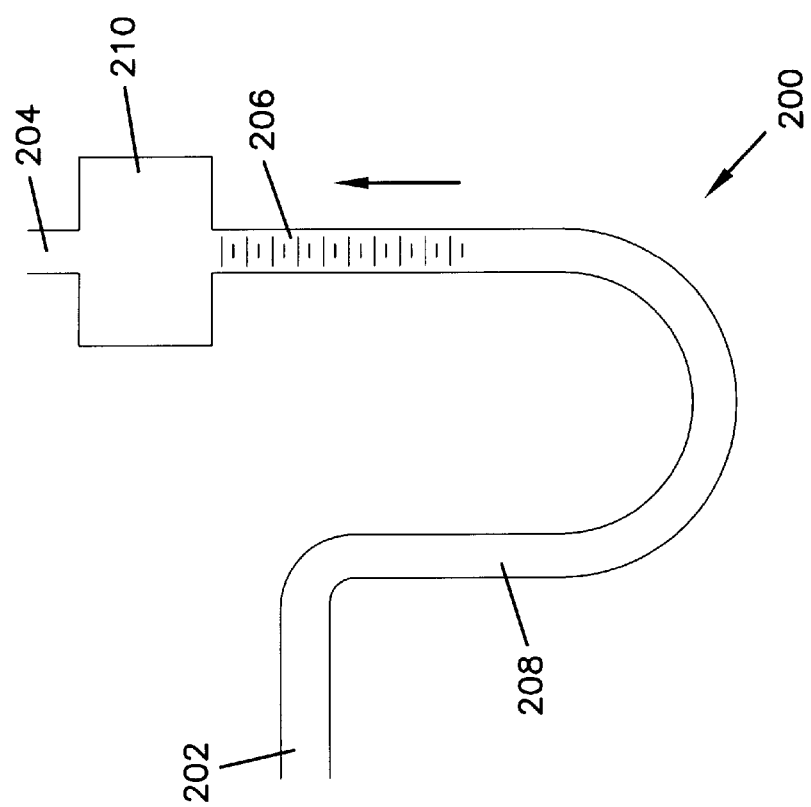
FIG. 12 is an illustration of a manometer that can be incorporated into the bubble leak tester of the invention.

With reference to FIG. 12, a manometer 200 is shown that can be used in combination with, or in place of, the bubble chamber 32. Since there is a shift in volume when the test volume 10 leaks, the volume change can be measured by the manometer 200. For positive pressures, one end 202 of the manometer apparatus 200 would be in communication with the reference port 54, while the other end 204 of the manometer apparatus 200 would be in communication with the test port 52. The manometer 200 includes a scale 206 on the side thereof that is reflective of the change in volume when a leak occurs. A liquid 208 is disposed within the manometer 200, and when a leak occurs in the test part, the pressure is higher at the end 202 than at the end 204, thereby causing the liquid 208 to rise up the scale 206. A reservoir 210 is formed in the manometer 200 prior to the end 204 to collect liquid 208 and prevent it from being forced out of the end 204. Further, like the bubble chamber 32, the manometer 200 could be disposed either inside or outside the housing 22, and a sensor could be used to electronically measure the change in liquid height at the scale 206.

Turning now to FIGS. 6A–6I, a first embodiment of the flow passages and valve arrangement 80 that are used to control flow within the bubble leak tester 20 or 20' is illustrated. The flow passages and valve arrangement 80 are disposed inside of the housing 22 of the leak tester.

Figure 6A:
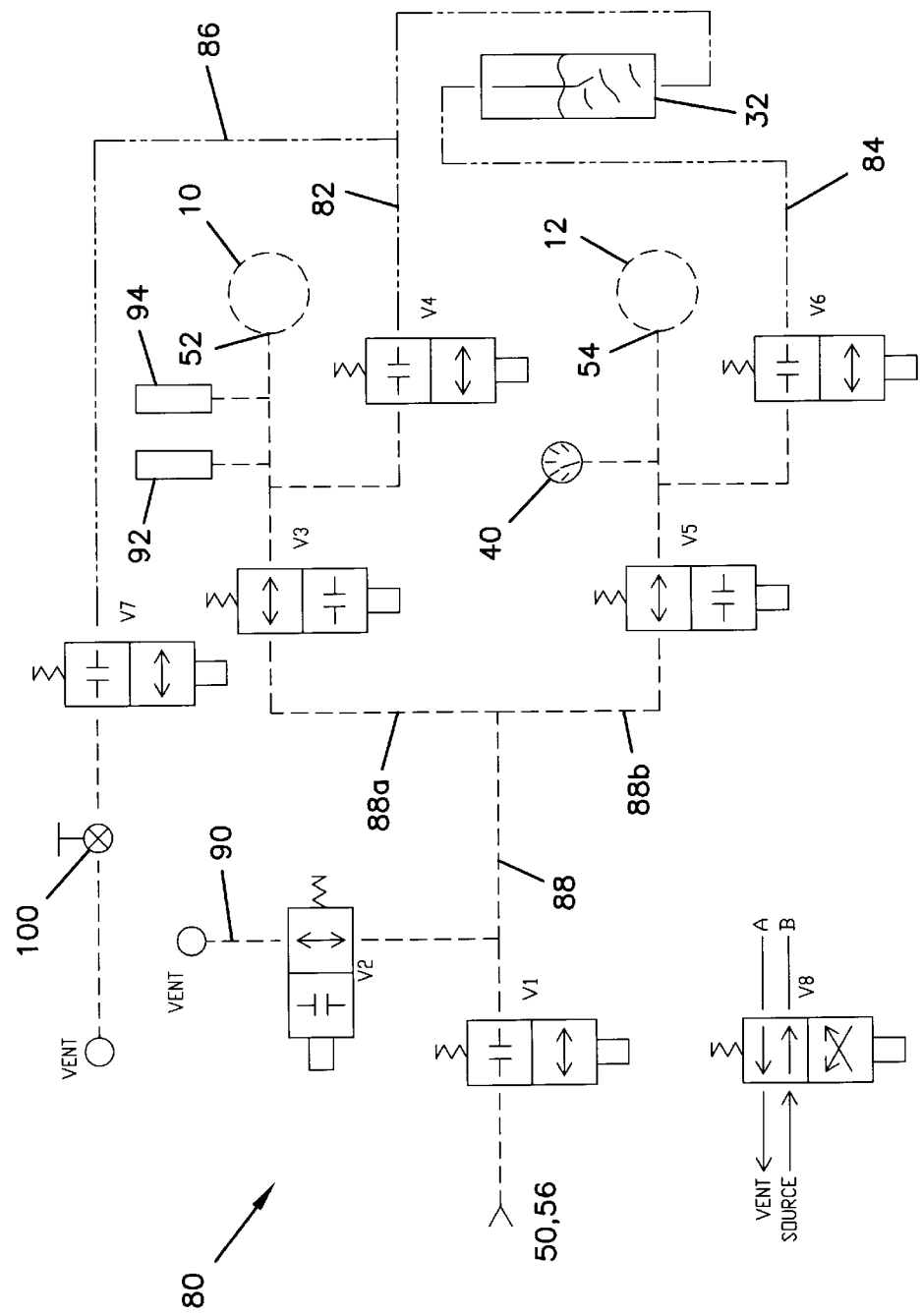
FIG. 6A is a schematic illustration of the valve arrangement that is used to control flow within the bubble leak tester for positive pressure situations, with the valve arrangement in a relaxed state.

FIG. 6A illustrates the valve arrangement 80 in a relaxed state, i.e. prior to testing, for positive pressure situations, with the valves of the valve arrangement being in their normal operating state. However, for negative pressure situations, the connection of the bubble chamber 32 with the test volume 10 and reference volume 12 would be switched as shown in FIG. 7, which illustrates the valve arrangement 80 in a relaxed state for negative pressure situations.

Figure 6B:
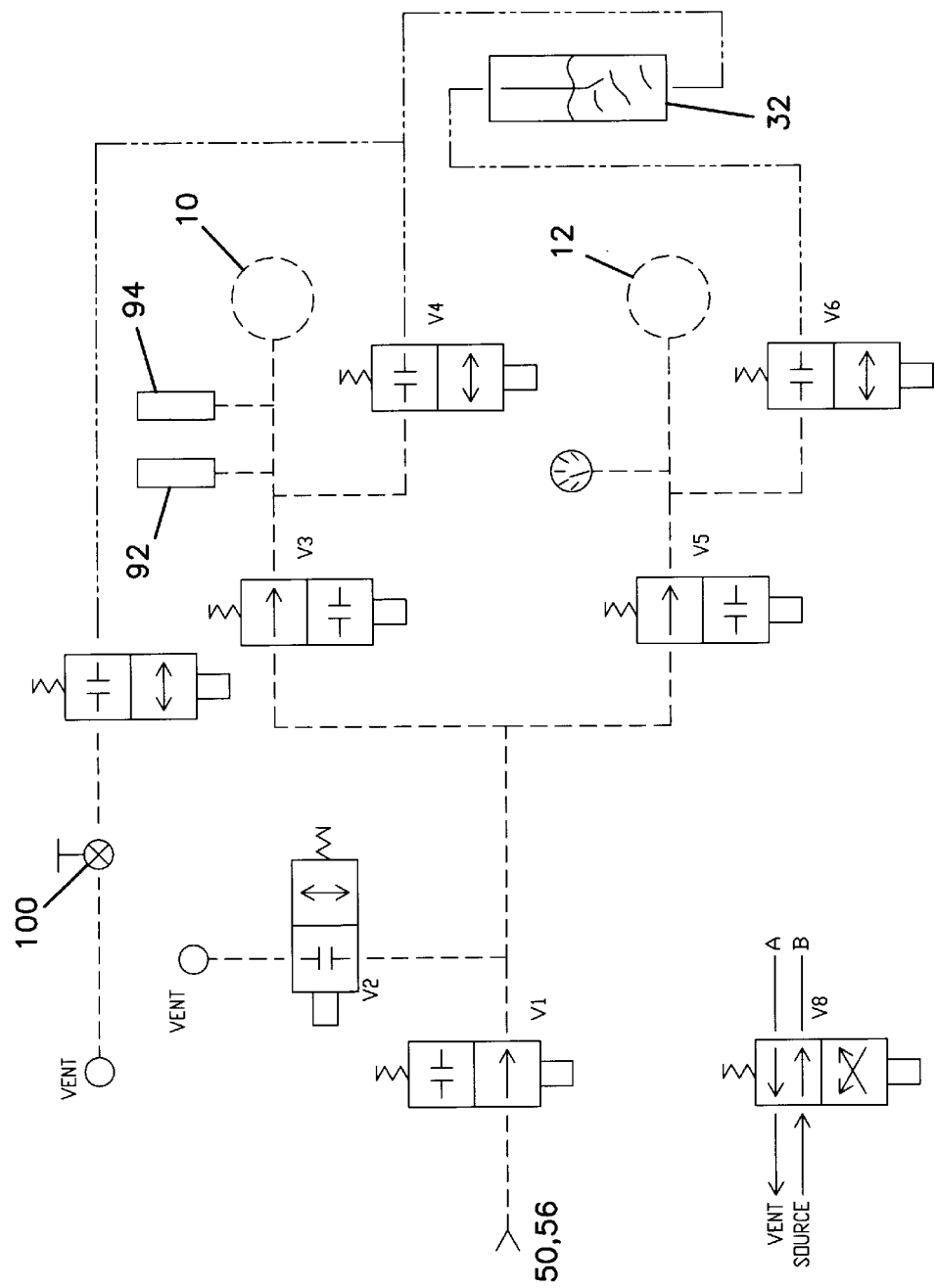
Figure 6C:
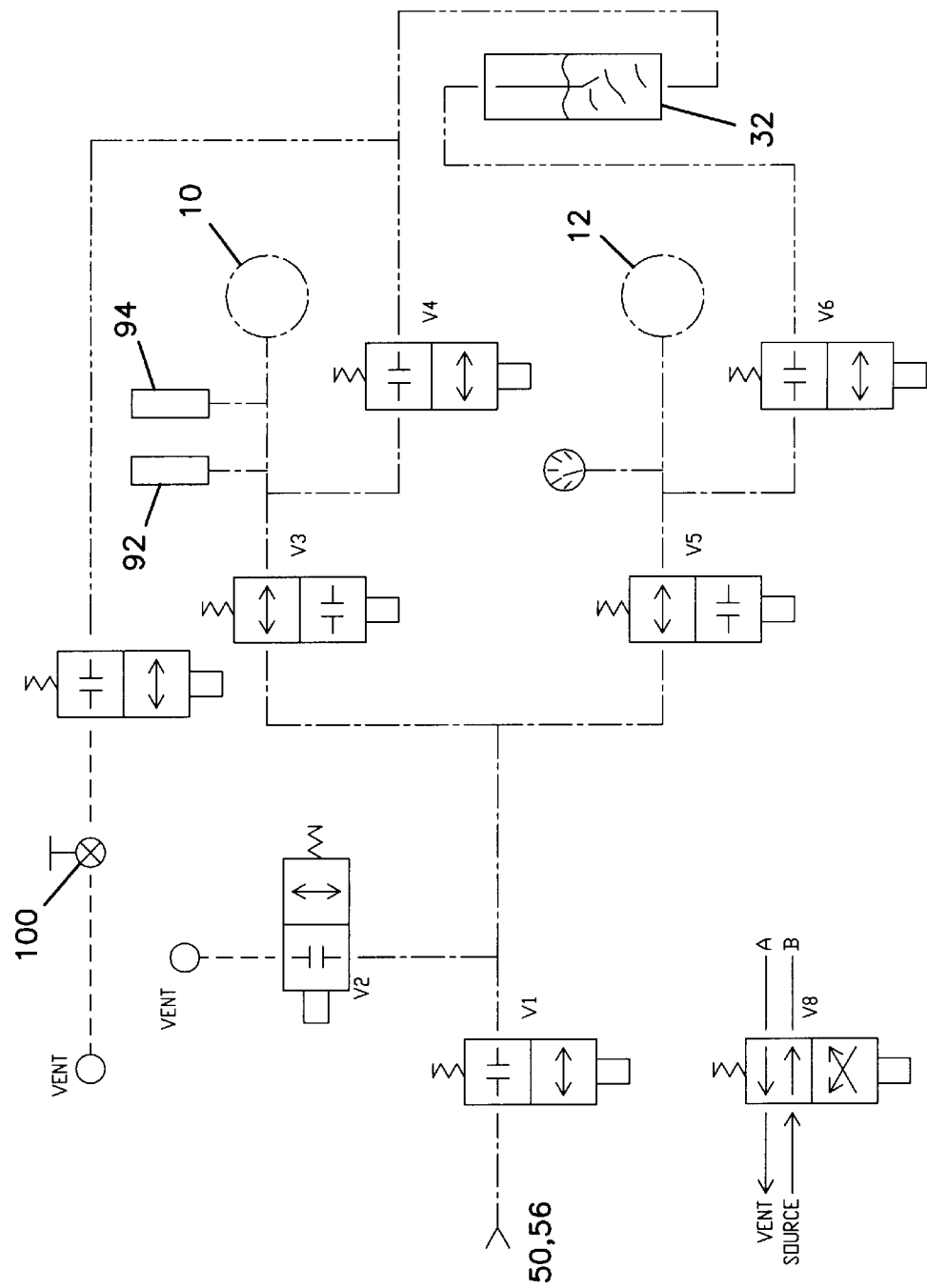
Figure 6D:
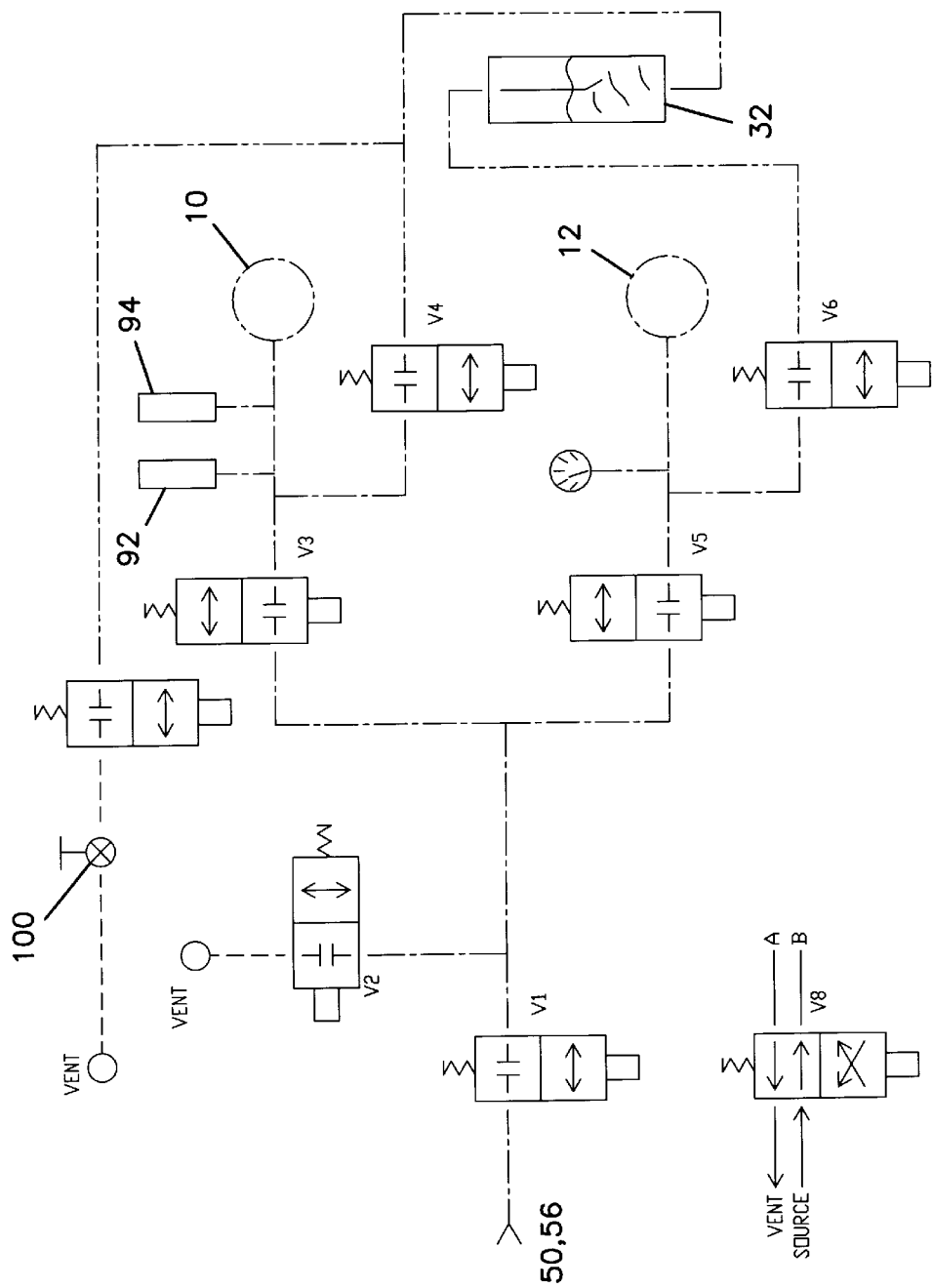
Figure 6E:
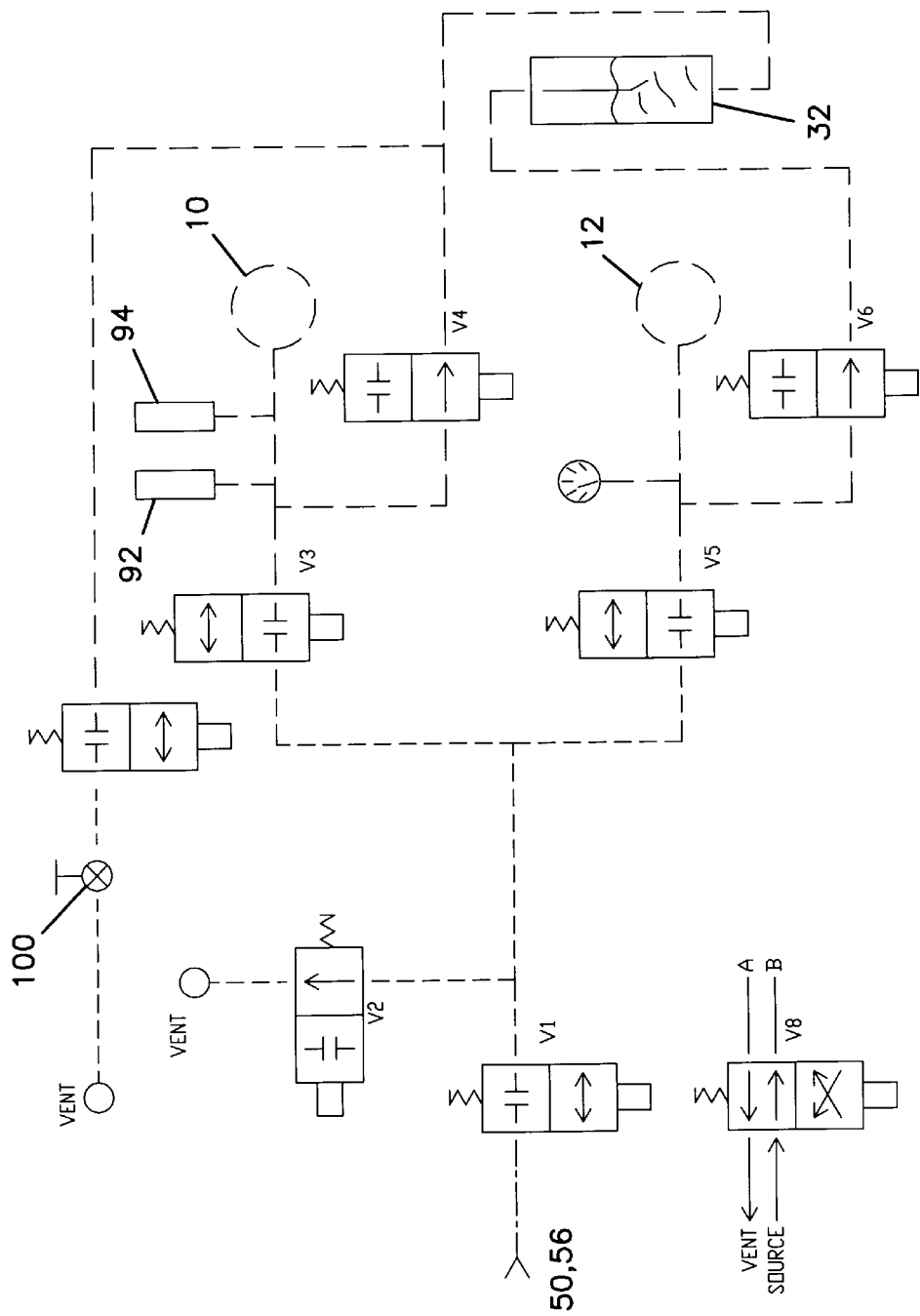
Figure 6F:
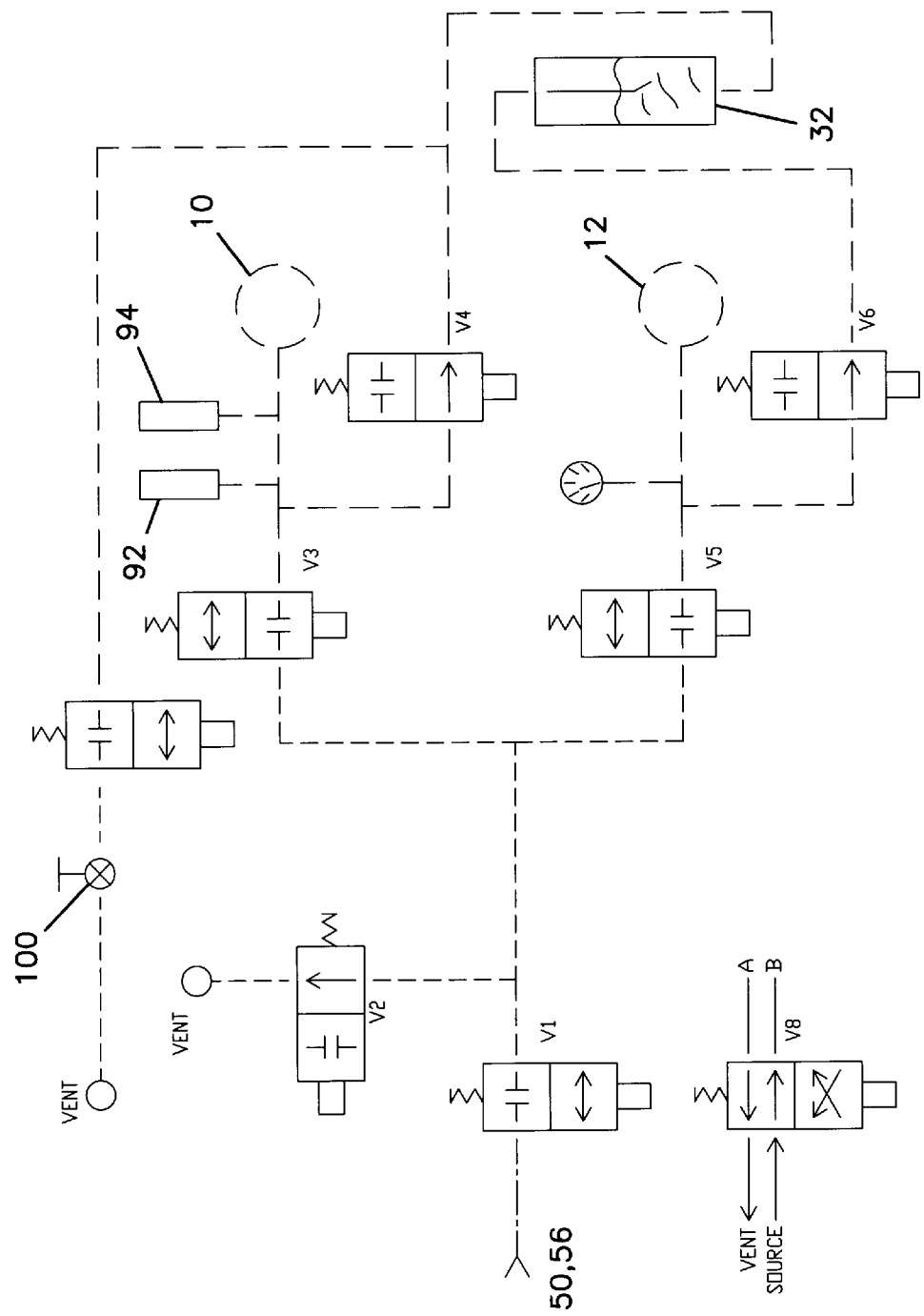
Figure 6G:
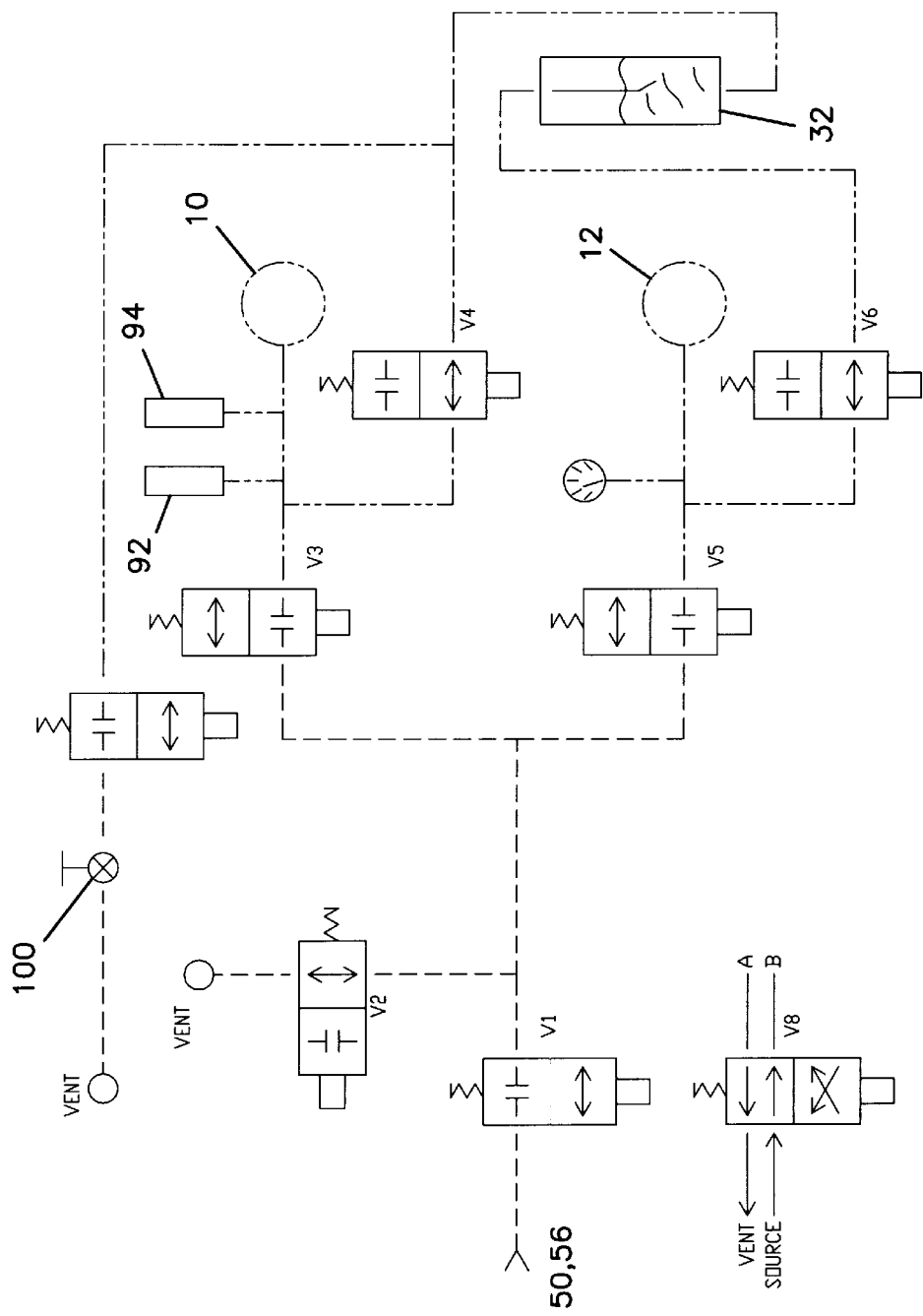
Figure 6H:
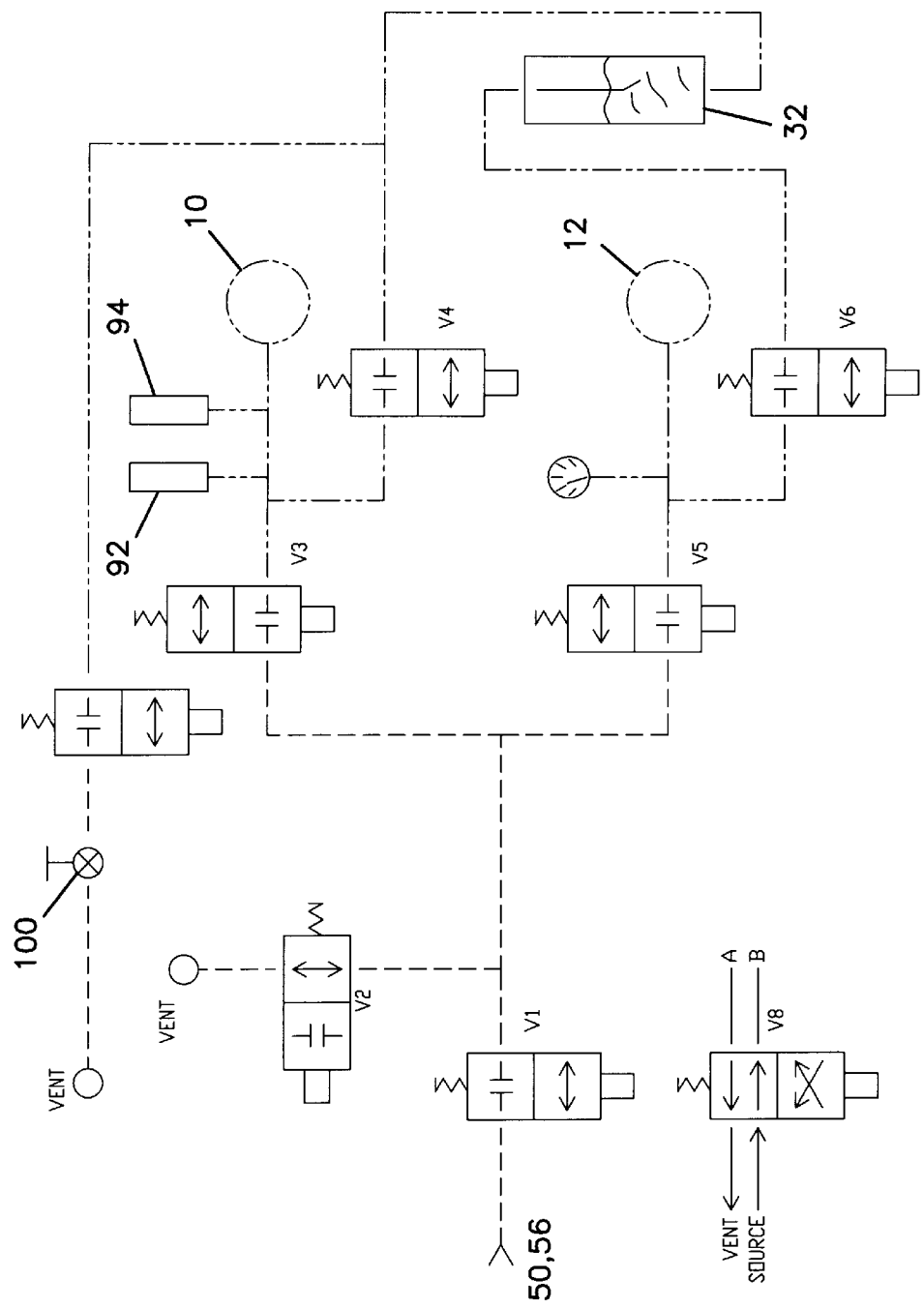
Figure 61:
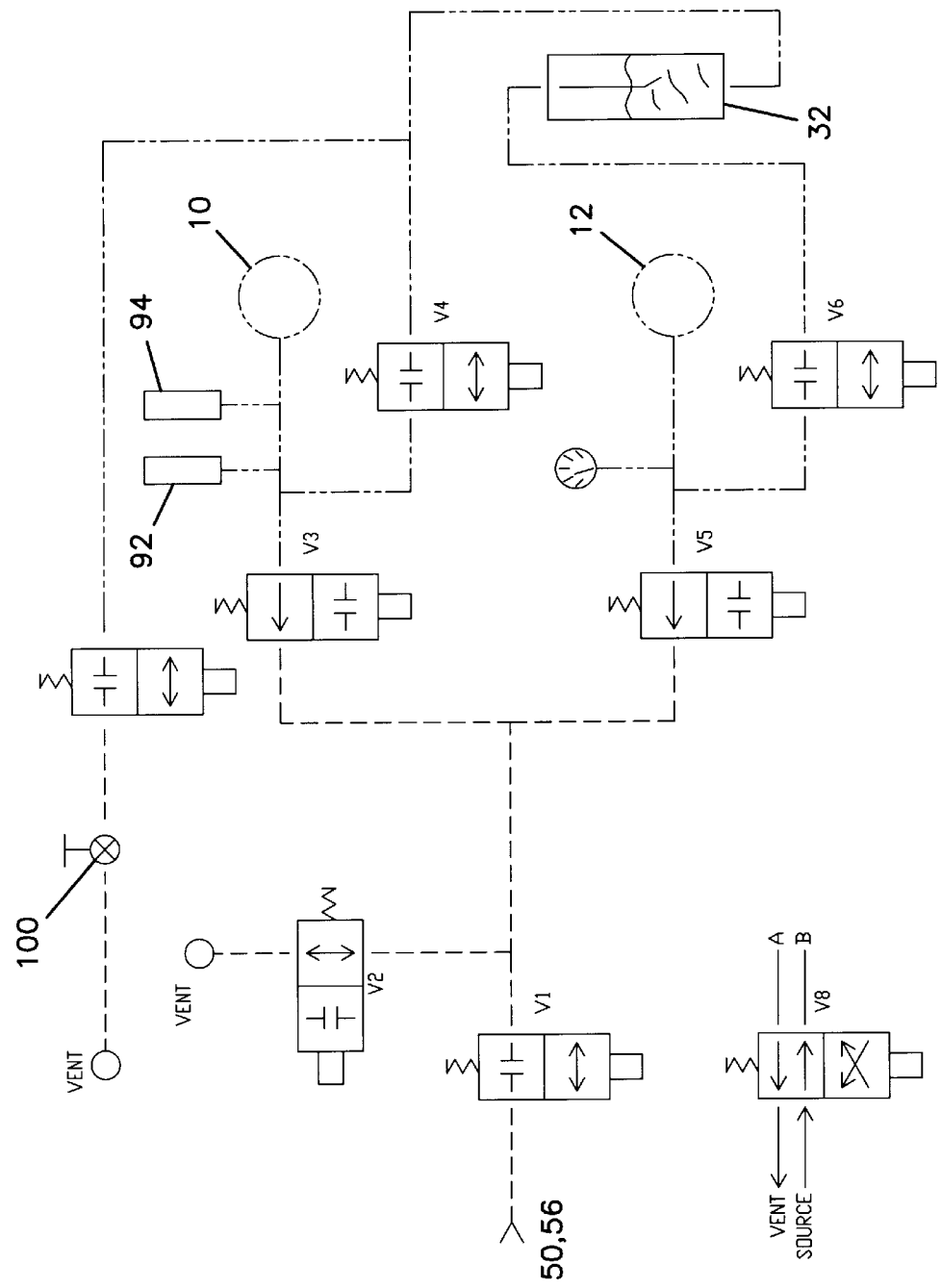
Figure 7:
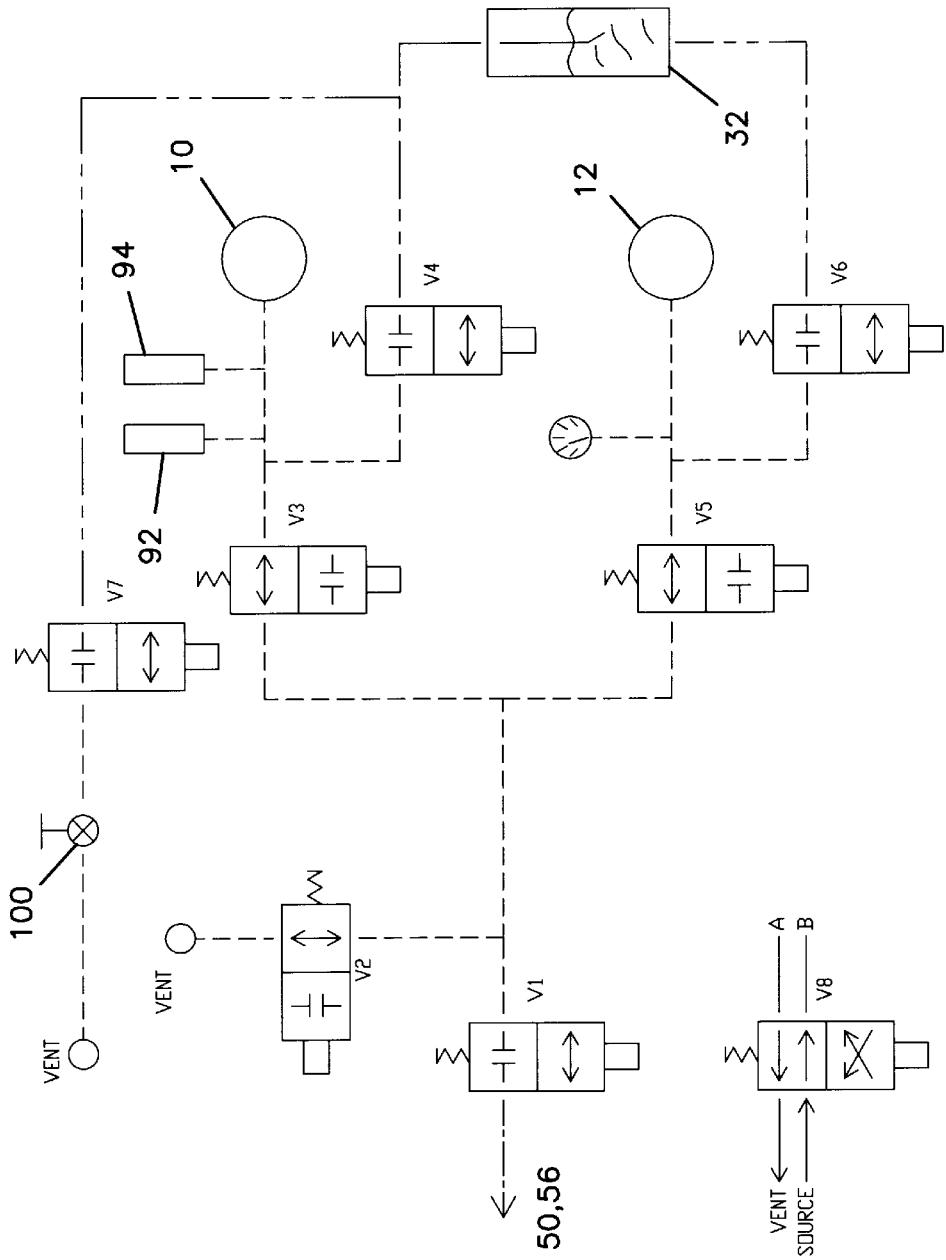
FIG. 7 is a schematic illustration of a valve arrangement similar to FIG. 6A, but for negative pressure situations.

Thus, the systems shown in FIGS. 6A and 7 are substantially similar, except for the connection of the test and reference volumes with the bubble chamber 32 and the direction of fluid flow that occurs within the flow passages. In order to facilitate the description of the invention, FIGS. 6B–6I will be described in relation to positive pressure. However, it is to be realized that a valve arrangement of the type shown in FIG. 7 operates in a similar manner, except for the direction of flow within the flow passages.

As FIG. 6A shows, the test and reference volumes 10, 12 are schematically illustrated as being connected to the leak tester 20, by connecting to the test port and the reference port, 52 and 54, respectively. A flow line 82 interconnects the test port 52 and the port 68 on the bubble chamber 32, and a flow line 84 interconnects the reference port 54 and the port 78 on the bubble chamber 32, to thereby achieve a system similar to that shown in FIG. 1. For negative pressure, i.e. vacuum, the bubble chamber 32 is essentially flipped such that the test port 52 is connected to the port 78 on the bubble chamber 32, while the reference port 54 is connected to the port 68 as shown in FIG. 7, in order to achieve a system similar to that shown in FIG. 2.

A vent line 86 connects to the flow line 82 and communicates with a vent, such as ambient air outside of the housing 22, to allow venting of pressure. An input line 88 extends from the input port 56 and branches into two lines 88a, 88b, with the line 88a joining with the line 82 leading to the test port 52, and with the line 88b joining with the line 84 leading to the reference port 54. A further vent line 90 is connected to the input line 88 and communicates with a vent, such as ambient air outside of the housing 22, to allow further venting of the pressure in the flow passages.

The pressure gauge 40 that is mounted on the front wall 24 of the housing 22 is connected to the flow line 84 adjacent the reference port 54 so as to measure the pressure adjacent the reference port 54 and reference volume 12. Further, a pair of pressure switches 92, 94 are disposed in the flow line 82 adjacent the test port 52 for sensing pressure at the test port 52 and test volume 10. The pressure switch 92 watches (i.e. senses) for the pressure to reach a predetermined set pressure before allowing the tester 20 to start. The pressure switch 94 on the other hand, senses if the pressure has fallen significantly, such as would occur in the case of a mass leak or removal of the test volume 10, and shuts the tester 20 down in the event of a rapid loss in pressure. Thus, the pressure switches 92, 94 are integrated into the control of the tester 20 to ensure that if the tester never pressurizes up, the tester will not start, and if the system does pressure up, but experiences a subsequent rapid loss in pressure, the tester will shut down. Each pressure switch 92, 94 is preferably adjustable, and they are preferably accessible by the user whereby they can be adjusted so as to allow control of the pressure set point at which each switch activates.

Alternatively, in the tester 20' of FIG. 4, the pressure switches 92, 94 would be replaced by a single pressure transducer (not shown) disposed within the housing. The pressure transducer would perform the same functions as the pressure switches 92, 94, i.e. waiting for a predetermined set pressure to be reached and sensing a significant reduction in pressure, and the pressure transducer would be integrated into the main controller of the tester 20' to allow the user to change the pressure set points of the pressure transducer by entering the new pressure set points via the keypad 150.

With reference to FIG. 6A, the valve arrangement 80 includes a plurality of valves V1–V7 for controlling the flow within the flow passages of the tester 20. The valves V1–V7 are preferably solenoid operated, bubble tight valves, such as in-line poppet valves, although other types of bubble tight valves could be used if desired. One such alternative valve will be described in relation to FIGS. 11A–F later in the description.

An auxiliary valve V8 is also provided that operates a pneumatic connector that may be used to connect the test and reference volumes 10, 12 to the ports 52, 54, respectively. Typically, the reference volume 12 would be generally permanently connected to the tester 20, such that only the test volume 10 need be connected to the port 52 by controlling the auxiliary valve V8. However, the test and reference volumes could each be manually connected to their respective ports 52, 54 if desired, in which case the auxiliary valve V8 could be eliminated.

FIG. 6A illustrates the valves V1–V7 in their initial states, where valve V1 is normally closed and forms a means for selectively controlling the flow of positively pressurized fluid into the input line 88 through the input port 56. Valve V2 is normally open and is disposed in the vent line 90 and thereby forms a means for selectively controlling flow through the vent line 90 to the vent. The valves V3 and V5 are normally open and are disposed in the lines 88a, 88b, thereby forming a means for selectively controlling flow to the test port 52 and reference port 54, respectively, and for selectively controlling flow between the test port and reference port. The valves V4 and V6 are normally closed and are disposed in the flow lines 82, 84, thereby forming a means for selectively controlling flow between the test port 52 and the bubble chamber 32 and between the reference port 54 and the bubble chamber 32, respectively. The valve V7 is normally closed and is disposed in the vent line 86, thereby forming a means for selectively controlling flow to the vent.

As FIG. 6A further shows, a valve 100, such as a needle valve, is also disposed in the vent line 86, downstream of the valve V7, for selectively controlling flow through the vent line 86. The valve 100 is manually preset by the manufacturer to allow a predetermined rate of fluid flow through the vent line 86 when the valve V7 is actuated open. The valve 100 is preferably preset by the manufacturer, and the end user would not alter the setting of the valve, so that the valve 100 acts as a fixed orifice in allowing a preset rate of fluid flow therethrough. The user would typically control the time that the valve V7 is open to control the amount of venting that is allowed to occur. It should be realized that the valve 100 could be replaced by a fixed orifice if desired.

The tester 20 is preferably provided with suitable controls to control the operation of the valves V1–V8 during the operation of the tester 20. The tester 20 is capable of performing at least three separate procedures during its operation: a testing procedure; a startup procedure; and a mass leak restart/pressurizing procedure. An example of each procedure will now be described in detail below.

Testing Procedure

The testing procedure is conducted by the tester 20 during the performance of an actual leak test. FIGS. 6B–6I illustrate the state of the valves V1–V7, as well as the pressure conditions in the flow passages, at certain stages during the testing procedure for positive pressure conditions. In FIGS. 6A–6I, a line —— represents a flow passage at source pressure, a line ------ represents a flow passage at atmospheric pressure, a line ——— represents a flow passage at a pressure less than source pressure, and a line ——— represents a flow passage at a pressure between source pressure and the initial pressure across the bubble chamber 32.

Figure 8:
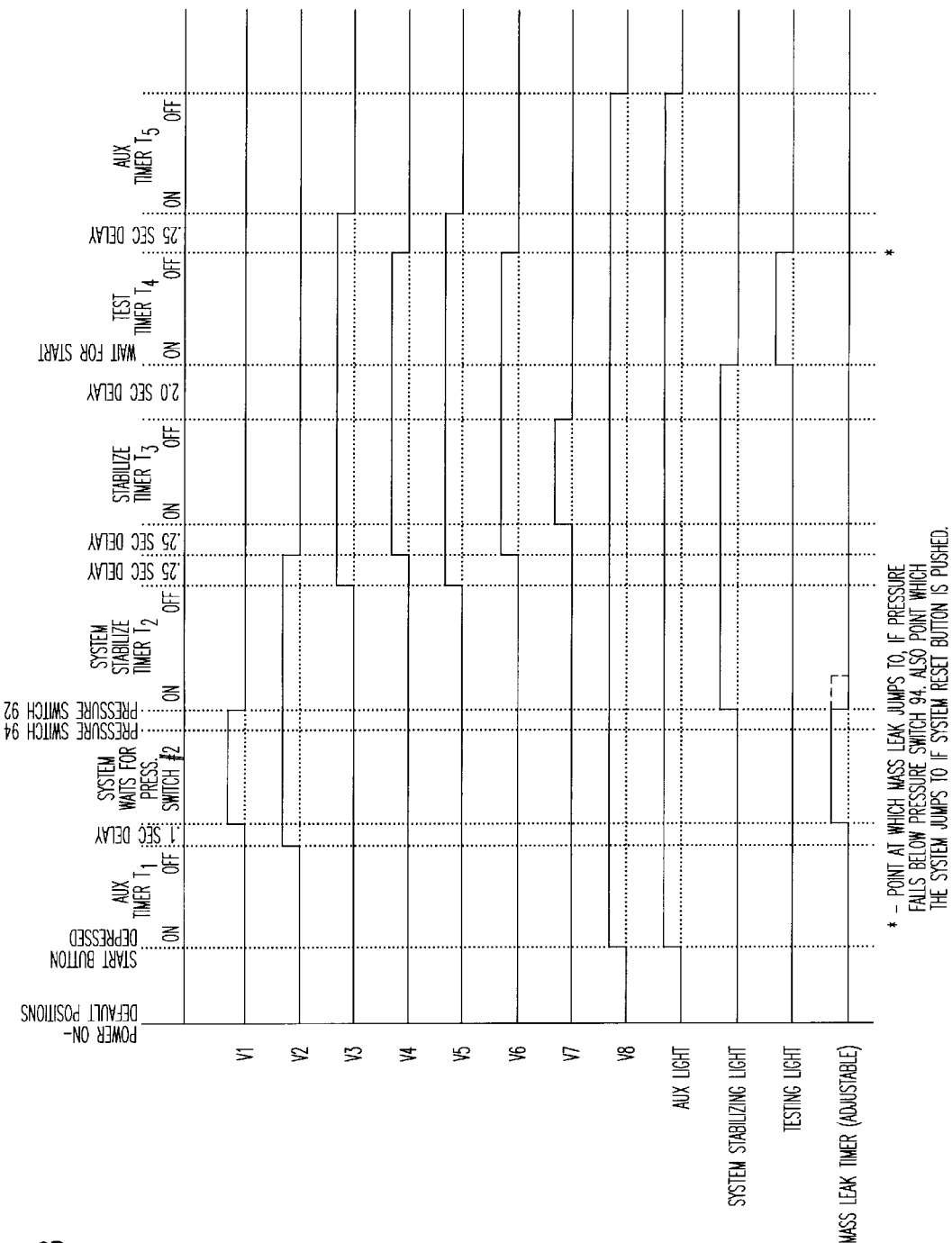
FIG. 8 illustrates a timeline of the operation of the valves and other components of the bubble leak tester during a testing procedure.

FIG. 8 illustrates a timeline related to the testing procedure. During the testing procedure, as well as during the other procedures, many timers are used to control the operation of the tester. The procedures have to be designed to ensure that there is always a pressure across the bubble chamber 32. This will cause the bubble chamber 32 to be on the verge of showing bubbles when testing by always allowing an initial surge of air to go through the tube 76 of the bubble chamber 32 to clear the bubble chamber 32 of backflow.

A preferred testing procedure is as follows:

Turn power on

Push start button

Aux. light on

V8 Energizes (Aux. valve dumps pressure or V1 enrizes)

Aux. timer $T_1$

V2 energizes about 0.1 sec delay

V1 energizes

Pressure switch 94 closes

Pressure switch 92 closes

System stabilizing light on

V1 de-energizes

System stabilize timer $T_2$

V3 & V5 energize about 0.25 second delay

V2 de-energizes

V4 and V6 energize about 0.25 second delay

V7 energizes Stabilizing timer $T_3$

V7 de-energizes about 2.0 see delay (the system waits for second start button before proceeding)

System stabilizing light off

Test light on

Test timer $T_4$

Test light off

V4 & V6 de-energize about 0.25 see delay

V3 & V5 de-energize

Aux. timer $T_5$

V8 de-energizes

Aux. light off

With reference to FIG. 6B and FIG. 8, after turning the tester 20 on and pushing the start button 34, the auxiliary valve V8 energizes thereby actuating a connector to connect to the test volume 10. Simultaneously, the auxiliary valve indicator light 42 illuminates, indicating that the valve V8 is in use. Further, once the start button 34 is pushed, an auxiliary timer $T_1$ starts. The auxiliary timer $T_1$ causes a delay to prevent the procedure from continuing before the connector connects to the test volume 10. After the delay caused by the timer $T_1$ the valve V2 energizes (i.e. closes) and after a predetermined delay, such as about 0.1 seconds, to ensure that the valve V2 properly energizes, the valve V1 energizes (i.e. opens). Thus, as shown in FIG. 6B, the pressure source 50 is in communication with the test and reference volumes 10, 12 to bring the two volumes up to the desired test pressure.

Provided that the test volume 10 is able to pressurize, the pressure switch 94 closes first and then the pressure switch 92 closes. Alternatively, when a pressure transducer is used, the system waits for the pressure transducer to sense that the test volume 10 has achieved the proper pressure and remains pressurized. The valve V1 then closes as shown in FIG. 6C, thereby closing off the pressure source, and the system stabilizing indicator light 44 comes on. A system stabilizer timer $T_2$ then starts, which delays the procedure for a period of time to allow the two volumes 10, 12 to come to an equilibrium state, thereby negating all thermal effects that are present in the two volumes due to the pressurization.

As was mentioned previously, one way to minimize thermal effects is to make the test and reference volumes 10, 12 equal in size. By making the volumes equal in size, or nearly so, the two volumes will have mirrored thermal effects, and any thermal effects in one volume will be counteracted by a counteracting thermal effect in the other volume, thereby minimizing the time needed to stabilize the two volumes. However, in the event that one volume is larger than the other, it may take several minutes or more for the two volumes to stabilize.

In addition, for filling large volumes, it would be beneficial to incorporate a bypass into the leak tester, in which the same or different source of pressure is directly connected to the two volumes, thereby bypassing the remainder of the system until pressurizing was complete. The bypass would allow large volumes to be pressurized in a shorter period of time, thereby speeding up the testing procedure.

Returning now to the preferred testing procedure, after the end of the stabilizing time, the valves V3 and V5 energize (i.e. close), as shown in FIG. 6D, so that the test volume and the reference volume are isolated from each other. After delaying for another predetermined period of time, such as about 0.25 seconds, to ensure that the valves V3 and V5 are closed, the valve V2 is opened, as shown in FIG. 6E, so as to vent the input line 88 and the lines 88a, 88b. Further, the valves V4 and V6 are energized (i.e. opened) as shown in FIG. 6E to communicate the test volume 10 and the reference volume 12 with the bubble chamber 32.

After the valves V4 and V6 are opened, the procedure again delays for a predetermined period of time, such as about 0.25 seconds, and then the valve V7 is energized (i.e. opened) to drop the pressure on one side of the bubble chamber 32, as shown in FIG. 6F, to provide a surge of air to clear out the bubble chamber 32 of any backflow. When the test volume and reference volume are connected with the bubble chamber 32, there could be a small amount of flow that could occur through the bubble chamber 32. The stabilizing timer $T_3$ delays for a period of time to allow the system to drop pressure on the one side and send a surge of air through the bubble chamber 32 to clean out the tube 76 of any liquid therein due to liquid backflow. After this delay period, the valve V7 is again closed for testing as shown in FIG. 6G, and the system delays for a period of time, such as about 2.0 seconds.

In certain circumstances, it would be beneficial to be able to pause the procedure at this point. For instance, it may be beneficial for the user to utilize two testers at the same time, in order to increase the amount of tests performed. Thus, the user could be setting-up one tester while the other is already set-up and ready for testing. However, while the user is occupied setting-up one tester, the test on the other tester may be missed. Therefore, it would be desirable to be able to pause the procedure at this point on one tester, just prior to testing, thus allowing the user to continue the set-up on the other tester without having to worry about missing the actual leak test.

To allow for this, the tester 20 is provided with a switch 102, such as a dip switch or the like, which must be thrown by the user prior to the start of the procedure if the user wants the procedure to automatically pause after the expiration of the 2.0 sec. delay so as to temporarily pause the procedure until the user again pushes the start button 34 to continue.

Alternatively, for the tester 20', the switch 102 would be eliminated, and the functions of the switch would be integrated into the system control of the tester 20', such that the system automatically pauses the procedure after the expiration of the 2.0 sec. delay, with the procedure continuing once the start button is pushed by the user. The user can preferably turn on and off the automatic stoppage of the procedure through inputs entered on the keypad 150.

Thus, the switch in the tester 20, as well as the switch-like functions in the tester 20', allows the user to set-up the second tester without having to worry about missing the test on the first tester. In the event that the switch 102 is not thrown on the tester 20 before beginning the procedure, or the switch-like functions in the tester 20' are not turned on, then the procedure will automatically continue after the 2.0 sec. delay ends.

Provided that the procedure has been paused, the start button 34 is pressed to continue the procedure, the system stabilizing indicator light 44 turns off and the system testing light 46 comes on initiating the actual leak test. The leak test is performed for a period of time determined by a test timer $T_4$. The test timer T4 can be manually set to however long the bubble chamber 32 is to be monitored for the presence of bubbles in the liquid. The presence of bubbles during the test time provides an indication that there may be a leak in the test volume. In this event, further testing can then be done on the test volume to determine the actual source and location of the leak.

Once the test time is completed, the test light 46 goes out, the valves V4 and V6 close, as shown in FIG. 6I, and after a predetermined period of delay, such as about 0.25 seconds, the valves V3 and V5 open to allow the two volumes to vent, as shown in FIG. 6I. An auxiliary timer $T_5$ then starts, which delays actuation of the valve V8 and thus prevents disconnection of the connector from the test part until the system goes to atmospheric pressure. After completion of this delay time, valve V8 actuates and the system is back to its initial state shown in FIG. 6A.

The testing procedure outlined above is thus used to test for a leak in the test volume. As is evident from FIGS. 6A–I, the valves V4 and V6 not only allow a pressure to be maintained across the bubble chamber 32, but the valves V4 and V6 also prevent the liquid 16 in the bubble chamber 32 from backflowing through the lines 82, 84 and into the volumes 10, 12. It is to be realized that the testing procedure could vary from that specifically described above. For instance, if the test volume 10 was manually connected to the test port 52, thereby eliminating the need for the valve V8, then the steps relating to the valve V8 could be eliminated.

Startup Procedure

As mentioned above with respect to the testing procedure, there should always be a pressure maintained across the bubble chamber 32. By maintaining a pressure across the bubble chamber 32, the pressure difference between the two volumes and the bubble chamber 32 when the valves V4 and V6 are opened will be minimized. Thus, when the two volumes 10, 12 are communicated with the bubble chamber 32, faster stabilization is achieved.

Figure 9:
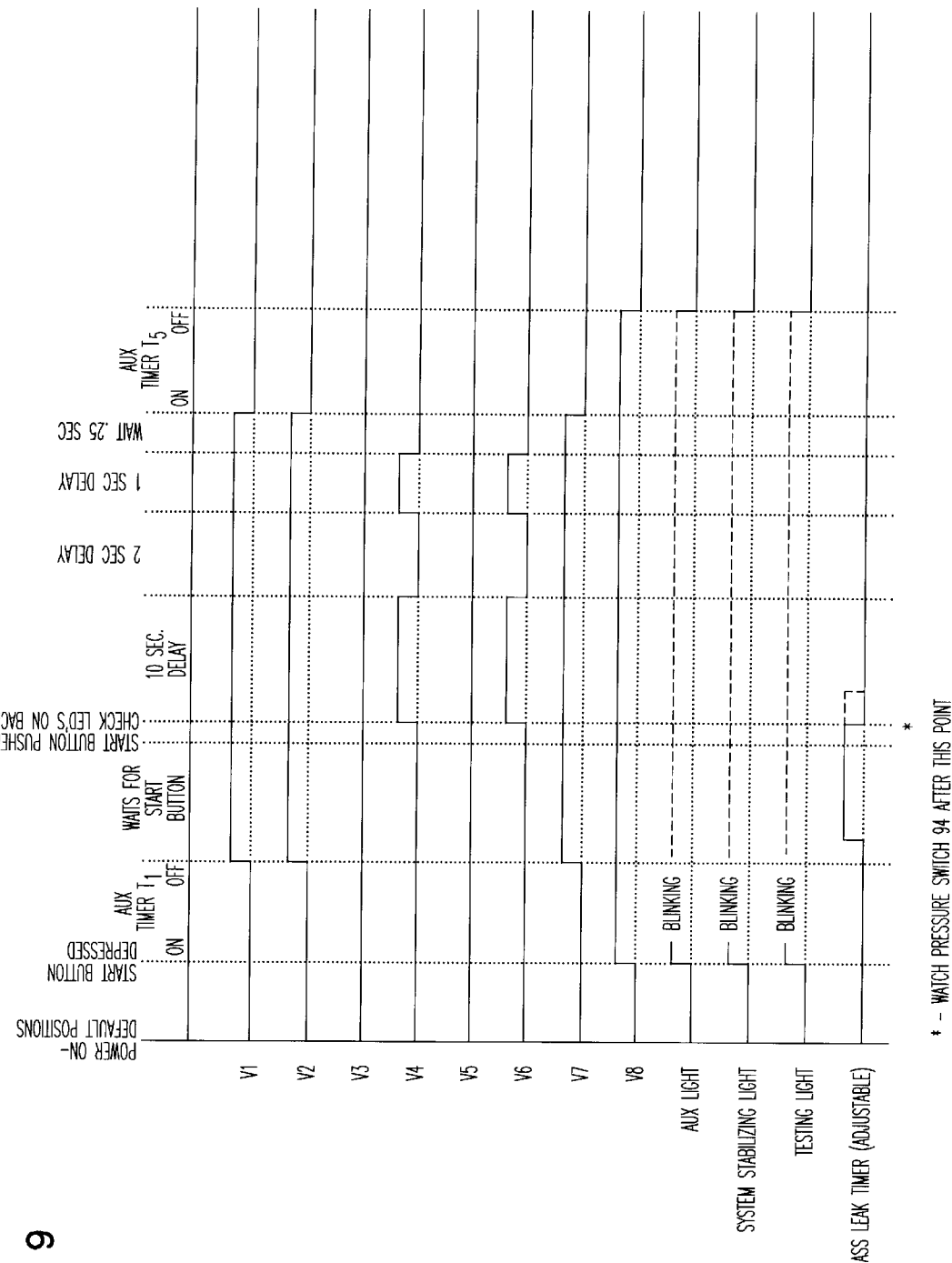
FIG. 9 illustrates a timeline of the operation of the valves and other components of the bubble leak tester during a startup procedure.

In order to achieve a pressure across the bubble chamber 32, the leak tester of the invention performs a startup procedure each time the start button 34 and the system reset button 36 are pushed at the same time, and the power to the tester is turned "on". The startup procedure need be performed only once at some point prior to performing the testing procedure, and will only be re-performed if the start button 34 and the system reset button 36 are pushed at the same time and the power to the tester is turned "on". Like the testing procedure, the startup procedure will be described for a positive pressure condition. FIG. 9 illustrates a timeline related to the startup procedure, showing the state of each valves V1–V8 during the procedure.

A preferred startup procedure is as follows:

The system is set up with a good test volume and a good reference volume.

The incoming air line is set to a pressure of 5% lower than the desired test pressure. (or 5% higher for vacuum) The "Start" and "System Reset" buttons are pushed simultaneously and held in, and the power switch is turned on. The buttons are then released. (The system will go into start-up mode. All LED's will be blinking.) The two LED's on the back of the tester should be on. If they are not, then the pressure gauges were not backed out far enough. (When a pressure transducer is used instead of the two pressure switches, the two LED's will not be present).

V8 is energized

Aux timer $T_1$

V1, V2 & V7 Energize

The user then turns the pressure switch 94 in until its LED goes out. The pressure switch 94 is rotated back and forth slowly to find the point at which the switch is activating. Once this point is found, the switch is backed off just slightly until the LED light comes on. This will set the pressure switch. For a pressure transducer, the pressures are set by the user through the user interface, i.e. keypad 150, on the tester 20'.

The incoming air line pressure is then set to 5% above the desired test pressure.

The pressure switch 92 is adjusted the same way as switch 94.

Once the pressure switches are set, the start button is pushed by the user.

The system checks both pressure switches to make sure they are on. If they are not, the system waits for the start switch.

The pressure switch 94 is monitored by the system, until the end of the procedure.

V4/V6 are then energized for about 10.0 sec.

V4/V6 are then de-energized.

The system waits about 1.0–2.0 seconds.

V4/V6 are again energized, for about 1.0 sec.

V4/V6 are then de-energized.

The system waits about 0.25 sec.

V1, V2 & V7 de-energize.

Aux. timer $T_5$

V8 is de-energized (System will automatically return to normal operating mode.)

With reference to FIG. 9, the startup procedure begins by connecting a test volume and reference volume to the tester 20. The incoming air pressure provided by the pressure source 50 is set to a pressure 5% lower (or 5% higher for vacuum conditions) than the desired testing pressure. Once this is done, the start button 34 and system reset button 36 are simultaneously pressed and held in, the power is turned on and then the buttons 34, 36 are released. The tester 20 will then automatically go into its startup mode. The tester 20 is preferably provided with a pair of LED's on the rear wall 30 thereof, with one LED providing an indication of the operation of the pressure switch 92 and the second LED providing an indication of the operation of the pressure switch 94. The two LED's are preferably on after the buttons 34, 36 are released. These two LED's are eliminated when a pressure transducer is used in place of the two pressure switches.

The valve V8 then energizes, and the auxiliary timer $T_1$ delays for a period of time before the valves V1, V2 and V7 energize. Then, the user adjusts the pressure switch 94 back and forth to find the point at which the switch is activating. Once this point is found, the pressure switch 94 is backed off slightly until its LED comes on. This sets the pressure switch 94. The pressure source is then set to a pressure 5% higher than the desired test pressure and the pressure switch 92 is then set in the same manner that pressure switch 94 is set.

After setting the pressure switches, the start button 34 must again be pressed. If the start button is not pressed, the procedure will not continue. Once the procedure starts, it is important that the system monitor the pressure switch 94 until the end of the procedure to check for a mass leak in the system. The valves V4 and V6 are then energized for a period of time, such as for about 10.0 seconds, and then de-energized. After waiting for a period of time, such as about 1.0–2.0 seconds, valves V4 and V6 are again energized, this time for a shorter period of time, such as about 1.0 seconds, after which the valve V4 and V6 are de-energized. The system then waits for a period of time, such as about 0.25 seconds, and then the valves V1, V2 and V7 are de-energized. The auxiliary timer $T_5$ then starts, delaying the time before the auxiliary valve V8 de-energizes. Once valve V8 de-energizes, the tester 20 is ready to perform the testing procedure.

The startup procedure set forth above, and illustrated in FIG. 9, pressurizes the bubble chamber 32 to a pressure that is less than source pressure but greater than ambient so that the pressure difference between the two volumes 10, 12 and the bubble chamber 32 during the testing procedure is minimized, thereby reducing the time needed to stabilize the system once the two volumes are communicated with the bubble chamber. It is to be realized that the startup procedure could vary from that specifically described above, particularly when a pressure transducer is used. The use of a pressure transducer will allow the system to automatically perform the majority of the startup procedure, thereby reducing the amount of user interaction required during the startup procedure.

Mass Leak Restart/Pressurize Procedure

Figure 10:
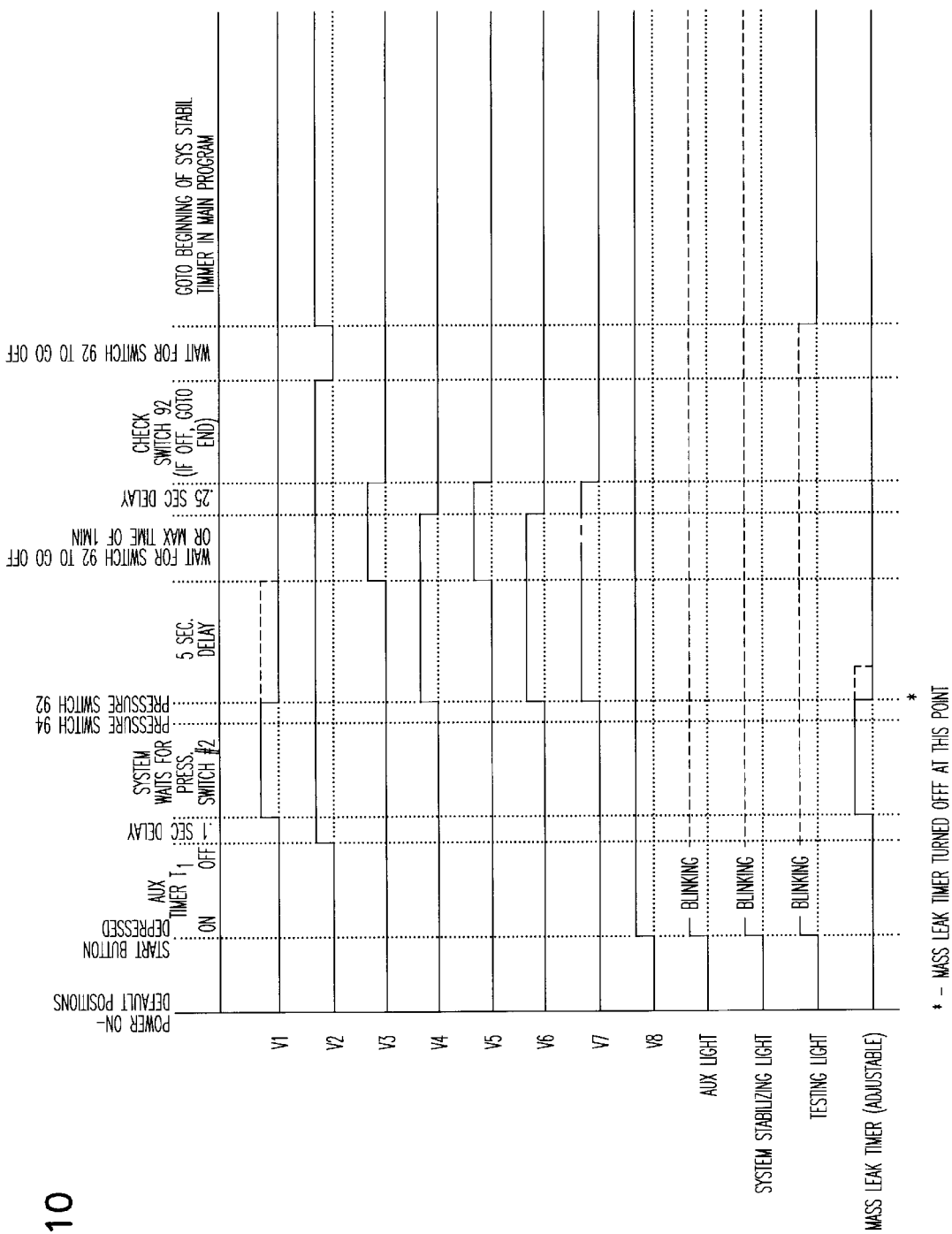
FIG. 10 illustrates a timeline of the operation of the valves and other components of the bubble leak tester during a mass leak restart/pressurize procedure.

In the event the pressure switch 94 senses that the pressure has fallen below the pressure set point of the switch 94, which is set in the startup procedure, thereby indicating that there is a mass leak in the system, the mass leak indicator light 48 will turn on, and the tester 20 will shut down. Next time the tester is run, the bubble chamber 32 will be pressurized and then the tester 20 will go directly into testing. This procedure is again described in relation to positive pressure conditions. FIG. 10 illustrates a timeline of the mass leak restart/pressurize procedure.

A preferred procedure is as follows:

The system is started as normal by pushing the start button. (The system will automatically go into start-up mode. All LED's will be blinking.)

V8 energizes

Aux. timer $T_1$

A mass leak timer is started

V1 & V2 Energize

The system monitors and waits for pressure switch 92 to activate

V1 is de-energized.

Once the pressure set by switch 92 has been reached, the system turns off the mass leak timer.

The system monitors pressure switch 94 until the end of the procedure.

The system then energizes V4/V6/V7 for about 5.0 sec., and the system monitors the pressure and energizes V1 as needed to maintain the pressure.

After this time delay, V1 is de-energized (if required).

V3/V5 are energized.

The system waits for switch 92 to go off. Max about 1.0 min.

V4/V6 are de-energized.

The system delays for about 0.25 sec.

V3/V5/V7 are de-energized.

The system checks if switch 92 is on. If not, the system goes to *.

V2 is de-energized.

The system waits for switch 92 to go off.

V2 is energized.

* Go directly to the beginning of the system stabilize timer $T_2$ in the main program.

The procedure is initiated by starting the tester as normal, whereby the tester will automatically go into its startup procedure and all LED's will be blinking. The valve V8 then energizes and the auxiliary timer $T_1$ delays for a period of time after which a mass leak timer starts. The valves V1 and V2 are then energized and the system monitors and waits for pressure switch 92 to activate. Once pressure switch 92 activates, the valve V1 is de-energized and the mass leak timer is turned off. Again, pressure switch 94 is monitored by the system until the end of the procedure.

The valves V4, V6 and V7 are then energized for a period of time, such as about 5.0 seconds. During this time, the system monitors the pressure switch 92 or the pressure transducer to check whether it has activated, thereby indicating that the pressure has dropped. In the event that pressure has dropped, V1 is again energized so as to bring the pressure back up. If the pressure does not drop, V1 need not be re-energized. In the event that V1 energizes to bring the pressure back up, the procedure de-energizes V1 after the 5.0 sec. delay so that the rest of the procedure can resume.

Valves V3 and V5 are then energized, at which point the system monitors the pressure switch 92, waiting for it to go off. The maximum time for waiting for the switch 92 is about 1.0 minute. Valves V4 and V6 are then de-energized, and after a predetermined delay time, such as about 0.25 seconds, valves V3, V5 and V7 are de-energized.

At this point, the system checks to see if switch 92 is on. If it is not on, the procedure goes directly to the beginning of the system stabilizer timer $T_2$ in the testing procedure. If the switch is on, valve V2 is de-energized and the system waits for the switch 92 to go off. Once the switch 92 is off, valve V2 is energized and the procedure goes directly to the beginning of the system stabilizer timer $T_2$ in the testing procedure.

The mass leak restart/pressurize procedure thus re-pressurizes the bubble chamber 32 in the event of a mass leak, and returns back to the testing procedure to resume testing. It is to be realized that the mass leak procedure could vary from that specifically described above.

With reference now to FIGS. 11A–F, an alternative valve arrangement 110 is illustrated that utilizes three-way valves V9–V11, a valve V12, and a valve 100, such as a needle valve. This arrangement 110 is similar to the arrangement 80, except that the two-way valves V5 and V6 are replaced by the single three-way valve V9, the valves V3 and V4 are replaced by the single three-way valve V10, and the valves V1 and V2 are replaced by the single three-way valve V11. The valve V12 and the valve 100 are the similar to the valves V7 and valve 100, respectively, in FIG. 6A. This embodiment is simpler in design than the embodiment in FIGS. 6A–I, and requires fewer valves than the first embodiment. The pressure designations in the flow passages is the same as is used for FIGS. 6A–I.

Like the first embodiment, the valves V9–V11 selectively control flow between a bubble chamber 112, the test port 52, the reference port 54 and the input port 56. The bubble chamber 112 is preferably the same type of bubble chamber as used in the first embodiment, however, the bubble chamber 112 could be different if desired. In addition, FIGS. 11A–F illustrate the valve arrangement 110 under positive pressure conditions. However, like the first embodiment, this embodiment can be used for negative pressure as well.

Figure 11A:
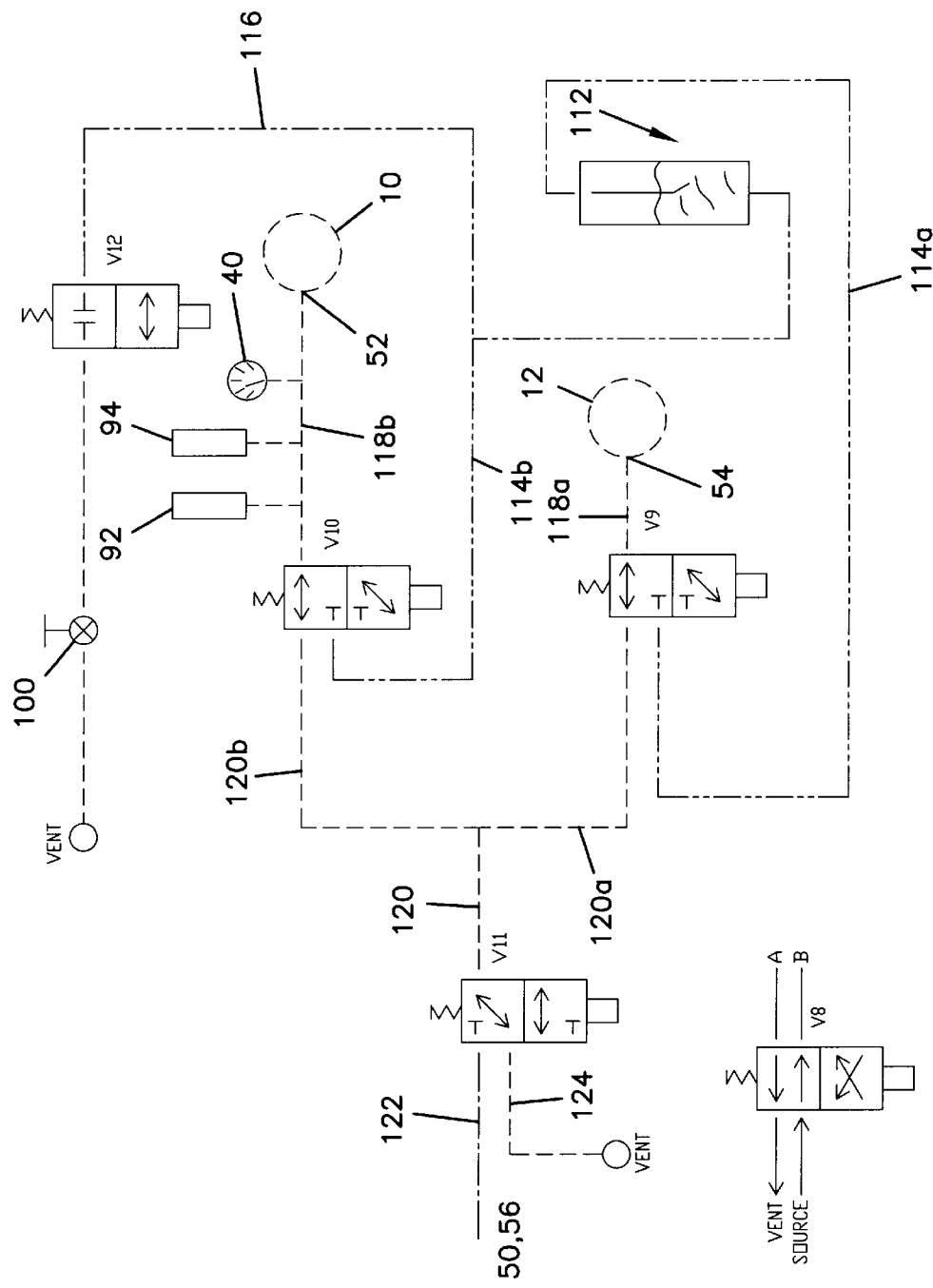
FIG. 11A is a schematic illustration of another embodiment utilizing a different valve arrangement to control flow within the bubble leak tester for positive pressure situations, with the valve arrangement in a relaxed state.

Referring now to FIG. 11A, flow lines 114a, 114b extend from the bubble chamber 112 to the valves V9, V10, respectively. A vent line 116 connects to the flow line 114b and communicates with a vent, such as ambient air outside of the housing 22, to allow venting of pressure. The valve V12 is disposed in the vent line 116 and allows flow therethrough, with the valve 100 being adjustable so as to control the amount of flow through the vent line 116. In addition, flow lines 118a, 118b extend between the valves V9, V1 and the reference port 54 and test port 52, respectively. A further flow line 120 extends from the valve V11 and branches into two lines 120a, 120b, with the line 120a connecting to the valve V9 and the line 120b connecting to the valve V10. An input line 122 extends from the input port 56 to the valve V11, and a further vent line 124 extends from the valve V11 and connects to a vent.

In this embodiment, the pressure switches 92, 94 and the pressure gauge 40 are all disposed in the flow line 118b leading to the test port 52 and test volume 10 for sensing the pressure in this line. Further, as in the first embodiment, the flow lines 114a, 114b are initially under pressure to ensure that there is a pressure across the bubble chamber 112. Thus, in the initial, relaxed state of the valve arrangement 110 shown in FIG. 11A, the valves V9, V10, V11 are positioned so as to communicate the test volume 10 and reference volume 12 with the vent line 124 so as to vent the two volumes. The two volumes 10, 12 are also in communication with each other at this point. Additionally, the valve V12 is closed, so that the flow lines 114a, 114b remain under pressure.

The valve V11 thus forms a means for selectively controlling the flow of positively pressurized fluid through the input port 56 and into the system, as well as forming a means for selectively controlling flow through the vent line 124 to the vent. The valves V9 and V10 form a means for selectively controlling flow to the test port 52 and reference port 54, respectively, for selectively controlling flow between the test port and reference port, and for selectively controlling flow between the test port 52 and the bubble chamber 112 and between the reference port 54 and the bubble chamber 112, respectively. The valve V12 is normally closed and is disposed in the vent line 116, and with the valve 100, forms a means for selectively controlling flow to the vent.

Figure 11B:
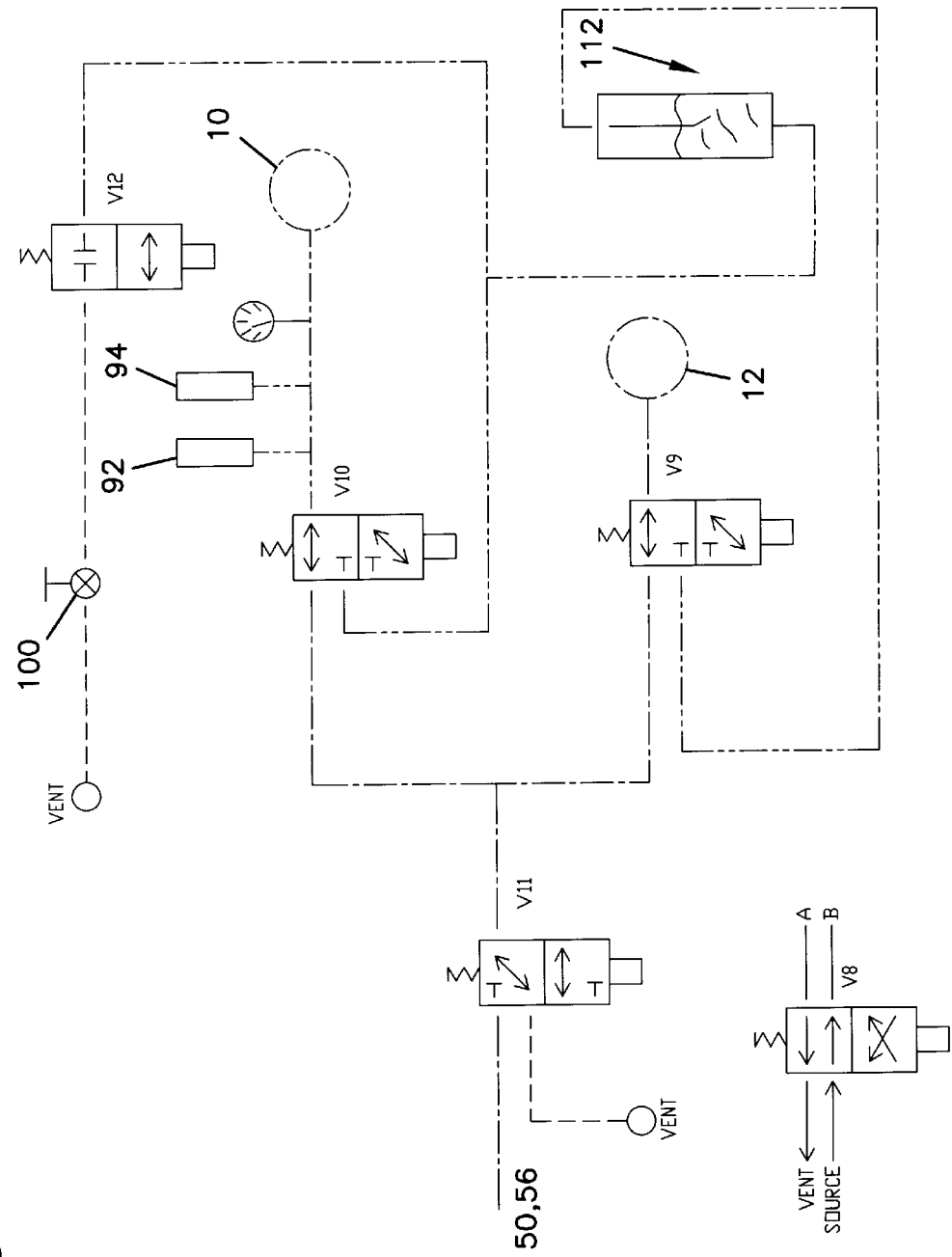
FIGS. 11B–F are schematic illustrations of the valve arrangement of FIG. 11A at different stages in the operation of the bubble leak tester.
Figure 11C:
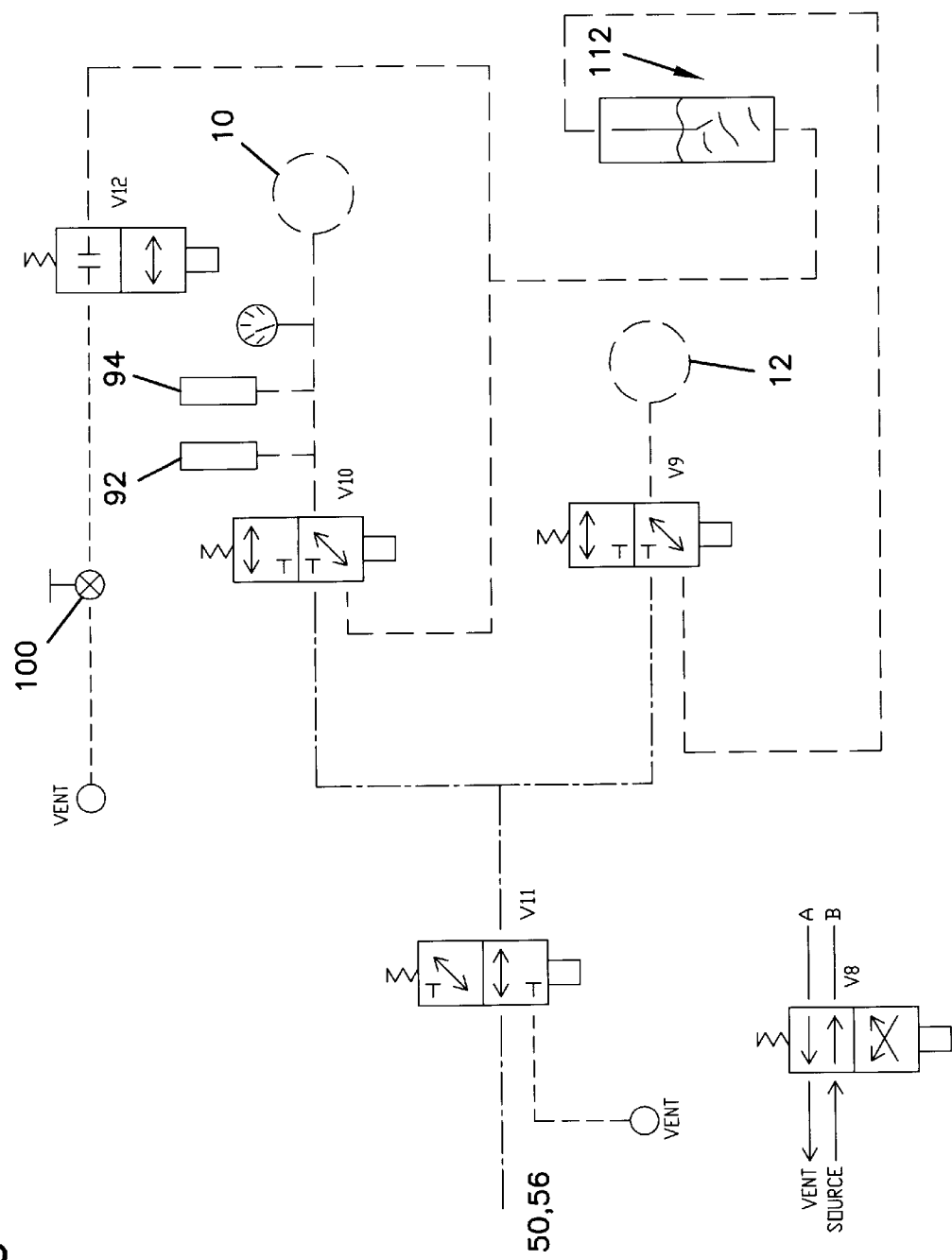

Turning to FIG. 11B, to pressurize the two volumes 10, 12, the valve V11 is actuated so as to communicate the input line 122, and thus the source of pressure 50, with the flow line 120 and thus with the two volumes 10, 12. Pressurization continues until the pressure switch 92 activates at the desired test pressure, as in the first embodiment. Once the desired test pressure is reached, the two volumes 10, 12 are isolated from the pressure source by suitably positioning the valves V9, V10 to close off communication with the source, and placing the two volumes in communication with the bubble chamber, as shown in FIG. 11C.

Figure 11D:
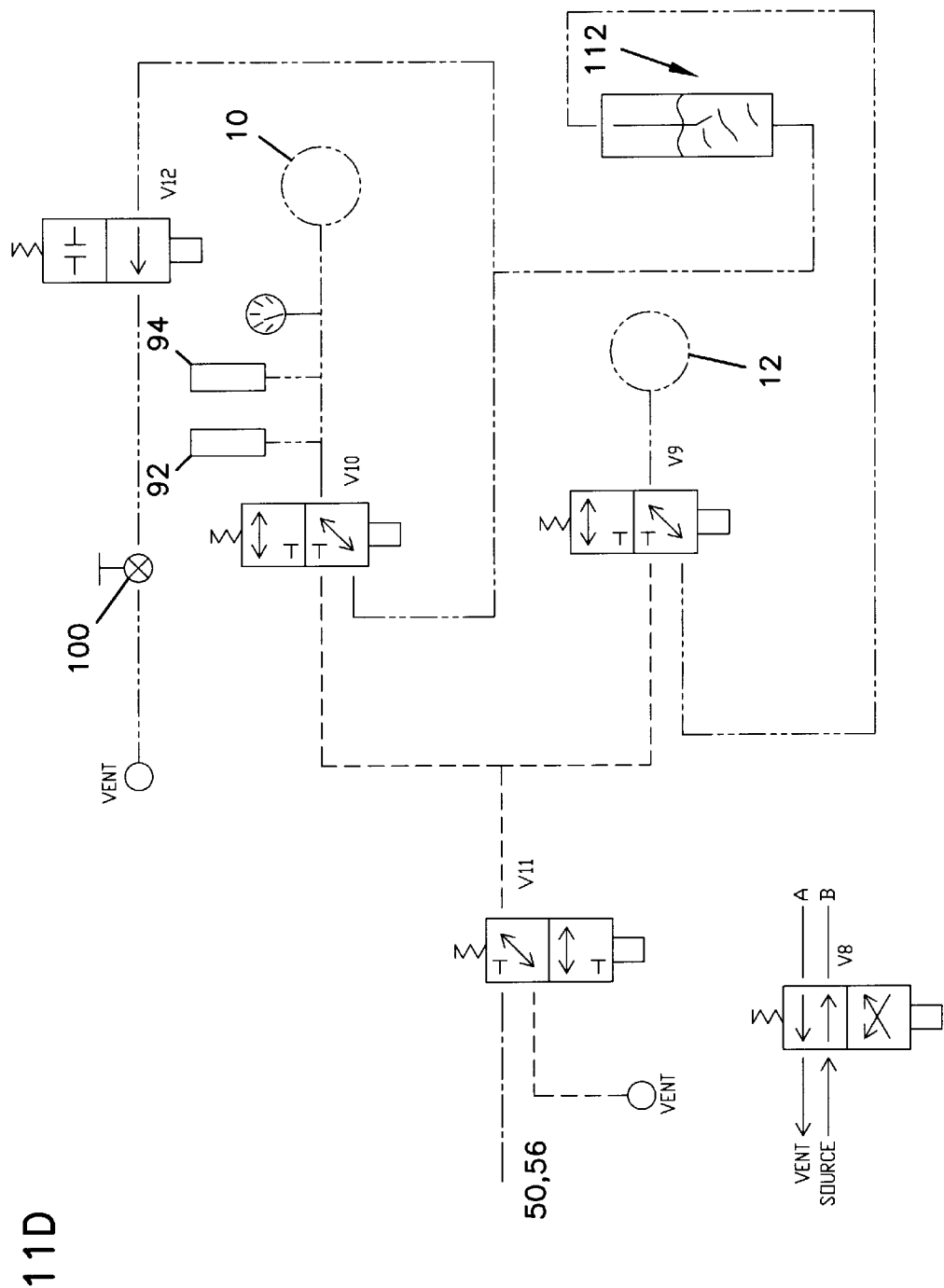
Figure 11E:
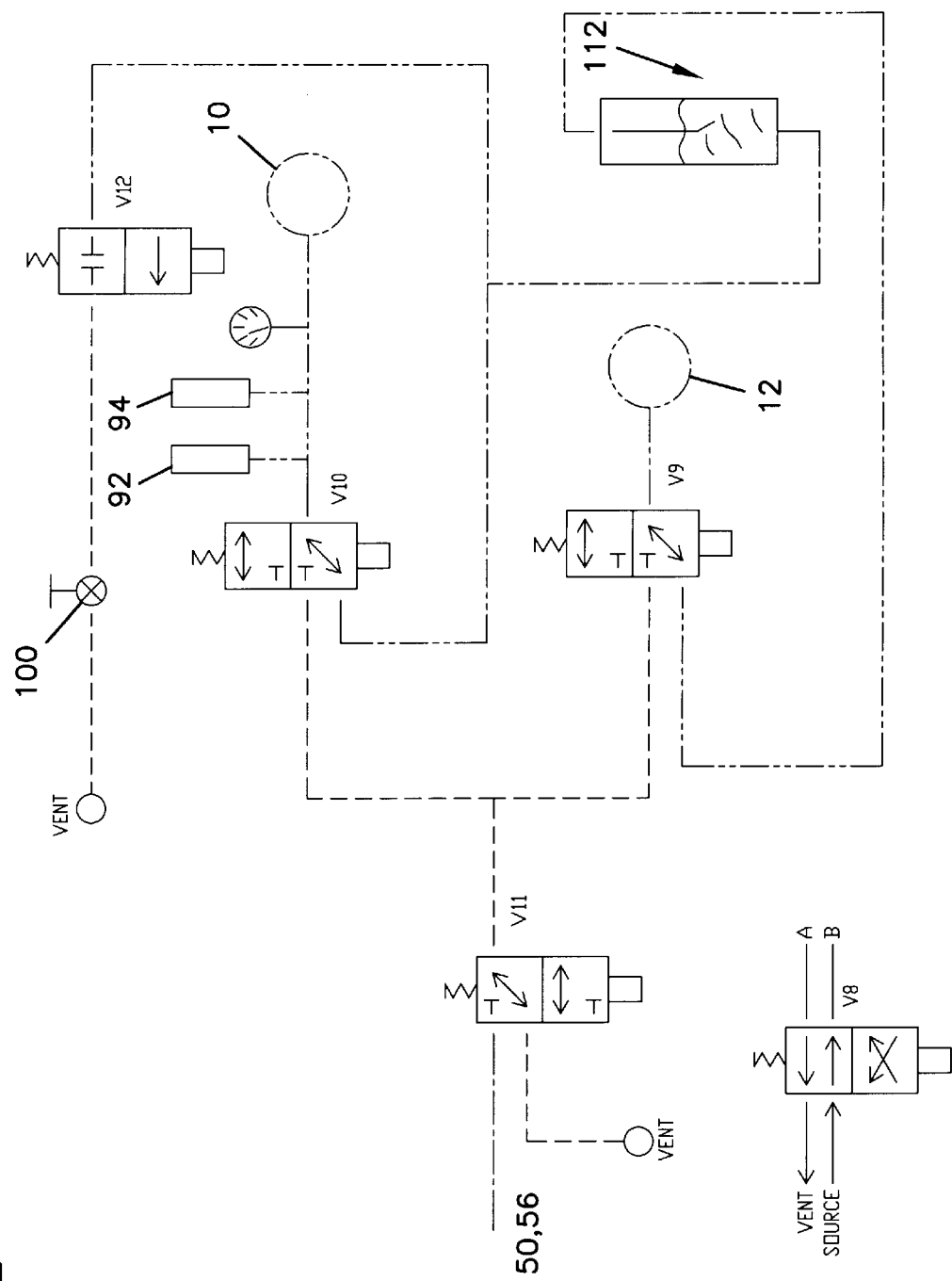

As shown in FIG. 11D, the valve V11 is then activated to vent pressure in the lines 120, 120a, 120b, and the valve V12 is activated momentarily prior to testing to allow a surge of air to clear the tube in the bubble chamber, as in the first embodiment. The valve V12 is then closed, and the system performs the leak test, as shown in FIG. 11E.

Figure 11F:
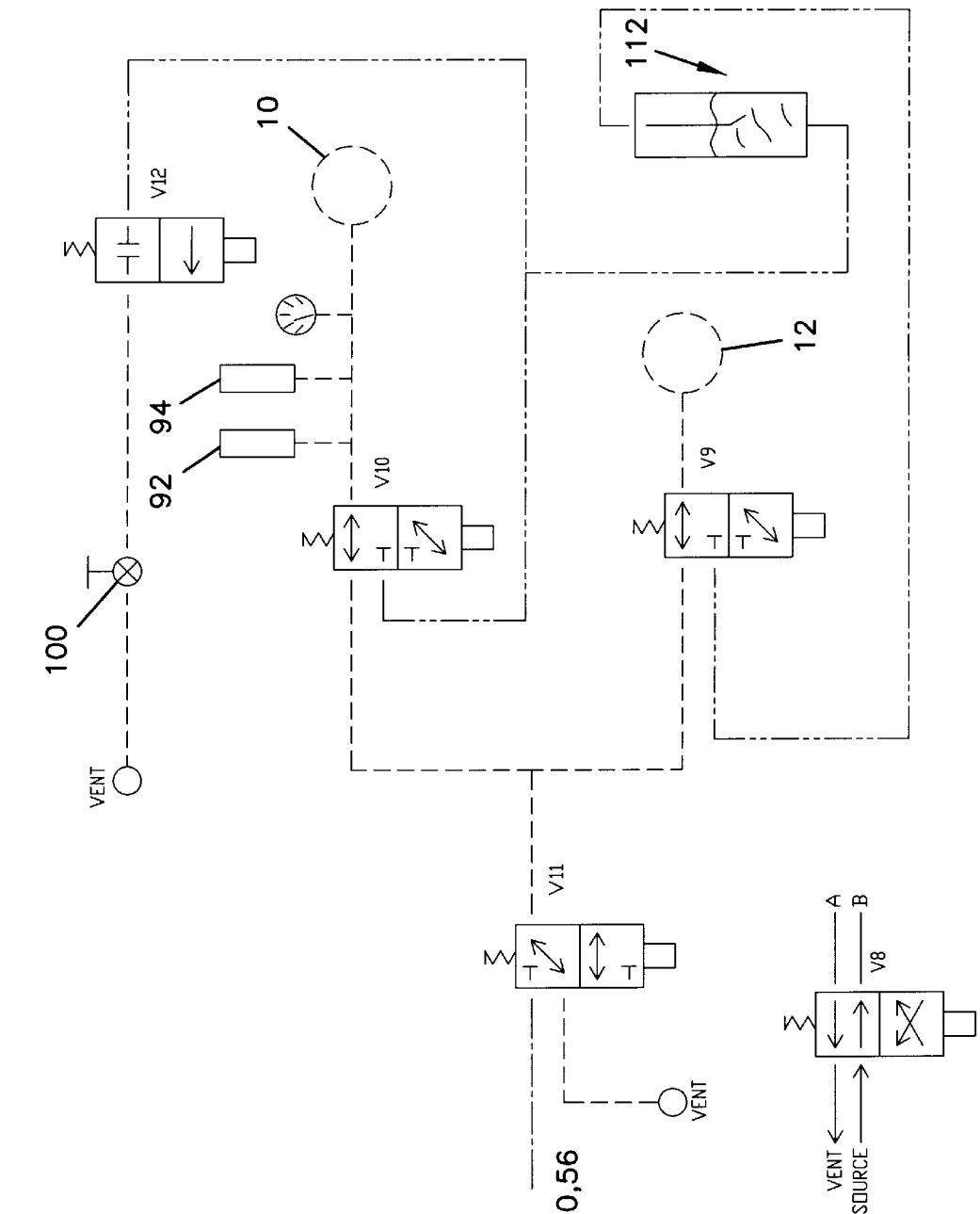

Once testing is completed, the valves V9, V10 are positioned as shown in FIG. 11F so as to vent the two volumes 10, 12 and the system is returned to its initial state, ready to conduct a new test.

A testing procedure, a startup procedure and a mass leak restart/pressurizing procedure would also be used with the embodiment of FIGS. 11A–F. These procedures would be similar to the corresponding procedures used for the embodiment of FIGS. 6A–I, but the procedures would be slightly modified to account for the difference in the valving used for each embodiment. The details of the procedures and timelines for use with the embodiment of FIGS. 11A–F would be readily apparent from the description of the procedures and timelines given for the embodiment of FIGS. 6A–I, and thus the details of the procedures and timelines are not discussed herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A leak tester that is connectable to a reference volume and a test volume for determining the presence of a leak in the test volume, comprising:

a reference port for connection to the reference volume;

a test port for connection to the test volume;

a bubble chamber connected between the reference port and the test port; and means for selectively controlling flow between the reference port and the bubble chamber and for selectively controlling flow between the test port and the bubble chamber.

2. The leak tester according to claim 1, further including an input port for connection to a source of pressure, the input port communicable with the reference port and the test port, and means for selectively controlling flow through the input port.

3. The leak tester according to claim 2, further including a vent line and means for selectively controlling flow through said vent line.

4. The leak tester according to claim 3, wherein said means for selectively controlling flow through said vent line comprises a plurality of valves disposed in said vent line.

5. The leak tester according to claim 3, wherein said vent line is connected to said bubble chamber.

6. The leak tester according to claim 3, wherein said vent line is communicable with said input port.

7. The leak tester according to claim 1, wherein said reference port and said test port are communicable with each other, and further including means for selectively controlling flow between the reference port and the test port.

8. A leak tester, comprising:
   a housing including a reference port that is connectable to a reference volume and a test port that is connectable to a test volume;
   a bubble chamber connected between the reference port and the test port; and
   a valve arrangement disposed within the housing for controlling flow within the leak tester, said valve arrangement capable of selectively controlling flow between the reference port and the bubble chamber and between the test port and the bubble chamber.

9. The leak tester according to claim 8, wherein said reference port and said test port are communicable with each other, and wherein said valve arrangement is further capable of selectively controlling flow between the reference port and the test port.

10. The leak tester according to claim 9, wherein the housing further includes an input port that is connectable to a source of pressure, the input port being connected to the reference port and the test port, and wherein said valve arrangement is further capable of selectively controlling flow through the input port.

11. The leak tester according to claim 10, further including at least one pressure sensor for monitoring pressure at the test port, and said valve arrangement being operable based upon pressure sensed by said at least one pressure sensor.

12. The leak tester according to claim 10, further including at least one timer controlling operation of the leak tester, and said valve arrangement being operable based upon operation of said at least one timer.

13. The leak tester according to claim 12, further including means for pausing operation of the leak tester.

14. The leak tester according to claim 8, wherein said valve arrangement includes a plurality of two-way valves.

15. The leak tester according to claim 8, wherein said valve arrangement includes a plurality of three-way valves.

16. The leak tester according to claim 8, wherein said bubble chamber comprises a housing defining a chamber in which a liquid is disposed, and a cap secured to said housing, said cap including a reservoir therein that is in communication with said chamber.

17. The leak tester according to claim 16, wherein said reference port is connected to said reservoir.

18. The leak tester according to claim 16, wherein said test port is connected to said reservoir.

19. The leak tester according to claim 16, wherein said cap is detachably secured to said housing.

20. A method of performing a leak test, comprising:
   a) providing a bubble chamber;
   b) connecting a reference volume and a test volume to the bubble chamber with the reference volume and the test volume being in communication with each other and isolated from the bubble chamber;
   c) communicating the reference volume and the test volume with a source of pressure;
   d) isolating the reference volume and the test volume from the source of pressure once a predetermined pressure is achieved within the test volume; and
   e) communicating the reference volume and the test volume with each other through the bubble chamber to perform the leak test.

21. The method according to claim 20, wherein step c) comprises communicating the reference volume and the test volume with a source of positive pressure.

22. The method according to claim 20, wherein step c) comprises communicating the reference volume and the test volume with a source of negative pressure.

23. The method according to claim 20, wherein between steps d) and e), allowing the pressure in the reference volume and the test volume to stabilize for a period of time.

24. The method according to claim 23, wherein after the period of stabilizing time has elapsed, isolating the reference volume and the test volume from each other.

25. The method according to claim 24, wherein subsequent to step e), delaying for a period of time, communicating the bubble chamber with a vent for a period of time, isolating the bubble chamber from the vent after the period of time has elapsed, delaying for a period of time, and then testing for a period of time.

26. The method according to claim 25, wherein after the period of time for testing has elapsed, isolating the reference volume and the test volume from the bubble chamber, delaying for a period of time, and communicating the reference volume and the test volume with the vent.

27. A method of operating a leak tester having a reference port, a test port, an input port connected to the reference port and the test port, a bubble chamber connected between the reference port and the test port, and a valve arrangement capable of controlling flow between the reference port, the test port, the input port and the bubble chamber, the method comprising:
   connecting a reference volume and a test volume to the reference port and the test port, respectively;
   using the valve arrangement to isolate the reference volume and the test volume from the bubble chamber; and
   performing a testing procedure to determine the presence of a leak in the test volume, said testing procedure including connecting a source of pressure to the input port and pressurizing the reference volume and the test volume, and placing the reference volume and the test volume in communication with each other through the bubble chamber.

28. The method according to claim 27, wherein the testing procedure further includes allowing the pressure in the reference volume and the test volume to stabilize for a period of time once a predetermined pressure is achieved within the test volume.

29. The method according to claim 28, wherein after the period of stabilizing time has elapsed, isolating the reference volume and the test volume from each other.

30. The method according to claim 29, wherein after placing the reference volume and the test volume in communication with each other: delaying for a period of time, communicating the bubble chamber with a vent for a period of time, isolating the bubble chamber from the vent after the period of time has elapsed, delaying for a period of time, and then testing for a period of time.

31. The method according to claim 30, wherein after the period of time for testing has elapsed: isolating the reference volume and the test volume from the bubble chamber, delaying for a period of time, and communicating the reference volume and the test volume with the vent.

32. The method according to claim 27, wherein prior to performing the testing procedure, performing a start-up procedure in order to pressurize the bubble chamber; said start-up procedure includes pressurizing the bubble chamber by controlling the valve arrangement.

33. The method according to claim 32, wherein the leak tester includes a pressure sensor for sensing pressure in the test volume; and wherein pressurizing the bubble chamber comprises placing the test volume and the reference volume in communication with the input port, setting the pressure to be sensed by the pressure sensor, placing the reference volume and the test volume in communication with the bubble chamber for a predetermined period of time, and isolating the test volume and the reference volume from the input port.

34. The method according to claim 33, wherein the leak tester includes a vent that is selectively communicable with the bubble chamber, the reference volume and the test volume; and wherein pressurizing the bubble chamber further includes placing the bubble chamber in communication with the vent when the test volume and the reference volume are in communication with the input port, isolating the bubble chamber from the vent when the test volume and the reference volume are isolated from the input port, and placing the test volume and the reference volume in communication with the vent when the bubble chamber is isolated from the vent.

35. The method according to claim 33, wherein the step of placing the reference volume and the test volume in communication with the bubble chamber comprises placing the reference volume and the test volume in communication with the bubble chamber for a first period of time and a second period of time.

36. The method according to claim 32, further including sensing pressure in the leak tester during the testing procedure and indicating a mass leak when the sensed pressure falls below a first predetermined level, and initiating a mass leak pressurizing procedure re-pressurizing the bubble chamber.

37. The method according to claim 36, wherein the mass leak pressurizing procedure comprises placing the test volume and the reference volume in communication with the input port, and sensing pressure to determine whether the pressure reaches a second predetermined level.

38. The method according to claim 37, wherein the leak tester includes a vent that is selectively communicable with the bubble chamber, the reference volume and the test volume; and wherein if the pressure reaches the second predetermined level, placing the bubble chamber in communication with the test volume, the reference volume, and the vent, and isolating the test volume and the reference volume from the input port; and wherein if the pressure does not reach the second predetermined level, isolating the test volume and the reference volume from the input port and venting the test and reference volumes.

39. The method according to claim 38, wherein if the pressure reaches the second predetermined level and after placing the bubble chamber in communication with the test volume, the reference volume, and the vent, isolating the reference volume and the test volume from each other, delaying for a first period of time, isolating the bubble chamber from the reference volume and the test volume, delaying for a second period of time, and the communicating the reference volume and test volume with each other and isolating the bubble chamber from the vent.

* * * * *